(12) United States Patent
Yamamura et al.

(10) Patent No.: US 7,988,187 B2
(45) Date of Patent: Aug. 2, 2011

(54) HEAD-PROTECTING AIRBAG APPARATUS

(75) Inventors: Daisuke Yamamura, Aichi-ken (JP);
Yuji Sato, Aichi-ken (JP); Koji Shibayama, Aichi-ken (JP)

(73) Assignee: Toyoda Gosei Co., Ltd, Aichi-pref (JP)

( * ) Notice: Subject to any disclaimer, the term of this patent is extended or adjusted under 35 U.S.C. 154(b) by 93 days.

(21) Appl. No.: 12/458,714

(22) Filed: Jul. 21, 2009

(65) Prior Publication Data
US 2010/0032930 A1 Feb. 11, 2010

(30) Foreign Application Priority Data
Aug. 7, 2008 (JP) .................................. 2008-204387

(51) Int. Cl.
*B60R 21/16* (2006.01)

(52) U.S. Cl. ...................................... 280/730.2; 280/749
(58) Field of Classification Search ............... 280/730.2, 280/749
See application file for complete search history.

(56) References Cited

U.S. PATENT DOCUMENTS

| 7,025,378 B2 * | 4/2006 | Wang .......................... 280/730.2 |
| 2005/0184492 A1 * | 8/2005 | Shilliday et al. ........... 280/730.2 |

FOREIGN PATENT DOCUMENTS
JP A-2001-328503 11/2001

* cited by examiner

*Primary Examiner* — Eric Culbreth
(74) *Attorney, Agent, or Firm* — Posz Law Group, PLC

(57) ABSTRACT

A head-protecting airbag apparatus includes an airbag having such a vertical dimension that the lower end region thereof is located on the beltline of a door of a vehicle upon deployment. The airbag includes a plurality of vertical cells disposed side by side along an anteroposterior direction and each inflatable into a rod-like shape extending generally vertically and a reinforcing portion located either on the inboard side or on the outboard side of at least two adjoining vertical cells out of the vertical cells at the lower end region of the airbag. The reinforcing portion is in gas communication with the vertical cells and inflatable into a horizontal rod-like shape (extending across the adjoining vertical cells).

7 Claims, 18 Drawing Sheets

HEAD-PROTECTING AIRBAG APPARATUS

The present application claims priority from Japanese Patent Application No. 2008-204387 of Yamamura et al., filed on Aug. 7, 2008, the disclosure of which is hereby incorporated into the present application by reference.

BACKGROUND OF THE INVENTION

1. Field of the Invention

The present invention relates to a head-protecting airbag apparatus mounted on an upper periphery of a window of vehicle and including an airbag that is mounted to the vehicle body structure by an upper edge thereof and deployable downward by inflation gas to cover the window.

2. Description of Related Art

In the prior art, JP 2001-328503 is illustrative of a head-protecting airbag apparatus mounted on an upper periphery of a window of a vehicle. This apparatus includes an airbag that extends up to below the beltline of a door at deployment so as to properly protect an occupant's head in the event of rollover. Specifically, the airbag of this conventional airbag apparatus includes a head-protecting portion that has a plurality of vertical cells inflated in rod-shape and disposed side by side along an anteroposterior direction at deployment, and an extended inflatable portion below the head-protecting portion. The extended inflatable portion is thinner than the head protecting portion and extends up to below the beltline at deployment.

In the event of rollover, by way of example, however, if an occupant's head, which is moving outward, contacts a boundary between the vertical cells of the above conventional airbag, the head-protection portion is likely to bend in V-shape as viewed from above due to the pressure applied by the occupant's head. At this time, although the extended inflatable portion is inflated and located on the inboard side of the beltline of a vehicle door, due to its thinness, it is possible for the extended inflatable potion to bend in a V-shape as well, overpass the belt line and eventually eject from the vehicle. Therefore, it is desired to securely retain an occupant's head within the vehicle during rollover for proper protection of the occupant's head.

SUMMARY OF THE INVENTION

An object of the present invention is to provide a head-protecting airbag apparatus that prevents ejection of an occupant's head securely in the event of rollover.

In accordance with the object of the present invention, a head-protecting airbag apparatus is provided. The airbag apparatus is adapted to be mounted on an upper periphery of a window of a vehicle and includes an airbag. The airbag is secured to the vehicle body structure by an upper edge thereof in a folded-up stored condition, on the upper periphery of the window, for deployment on the inboard side of the window. The airbag has such a length in a vertical direction that the lower end region thereof is located on the beltline of a door of the vehicle upon deployment. The airbag includes a plurality of vertical cells disposed side by side along an anteroposterior direction of the vehicle and each inflatable into a rod-like shape extending generally vertically; and a reinforcing portion located either on the inboard side or on the outboard side of at least two adjoining vertical cells out of the vertical cells at the lower end region of the airbag. The reinforcing portion is in gas communication with the adjoining vertical cells and inflatable into a horizontal rod-like shape.

Although the airbag of the invention has a plurality of vertical cells inflatable in a vertical rod-shape and disposed side by side in an anteroposterior direction, the airbag further includes the reinforcing portion that is deployable on the inboard side or outboard side of the lower end region of the airbag and in a rod-like shape extending in a horizontal direction. The reinforcing portion is formed to extend across at least two adjoining vertical cells in the vicinity of the lower ends of the adjoining vertical cells. The reinforcing portion acts like a supporting plate for the adjoining vertical cells and prevents the airbag from bending in a V-shape on the boundary of the adjoining cells as viewed from above even in the event that a pressure of an occupant's head moving outward is applied on the boundary of the adjoining cells upon rollover or the like. More specifically, in an instance where the reinforcing portion is located on the inboard side of the vertical cells, when an occupant's head bumps against the boundary of the vertical cells and pushes same outward, the reinforcing portion prevents ends of the adjoining cells facing away from the boundary from moving inward and thus prevents the boundary of the adjoining cells from moving outward. In an instance where the reinforcing portion is located on the outboard side of the vertical cells, the reinforcing portion prevents the boundary from moving outward when an occupant's head contacts the boundary of the adjoining cells. Consequently, the airbag apparatus of the invention prevents such a deformation of the airbag that may cause the lower end region of the airbag to overpass the beltline of a door and eventually eject from the vehicle, and therefore, the lower end region of the airbag is well supported by the beltline and the airbag supported by the beltline is able to properly protect an occupant's head while preventing outward movement of the same.

Therefore, the head-protecting airbag apparatus of the invention prevents ejection of an occupant's head securely in the event of rollover.

It is desired that the airbag described above is formed by folding back an airbag material in which the reinforcing portion is arranged below the adjoining vertical cells on a fold line extending along the boundary of the vertical cells and the reinforcing portion and by coupling overlapped portions partially, and that each of the adjoining vertical cells includes at the lower end a communication port that allows gas communication with the reinforcing portion.

With this configuration, the airbag can be manufactured by simply bending the airbag material having the vertical cells and reinforcing portion in one piece on the fold line extending along the boundary of the vertical cells and reinforcing portion and coupling the same together partially, which facilitates manufacturing of an airbag in comparison with an instance where the reinforcing portion is prepared separate from the vertical cells.

In the above instance where the airbag is formed of the airbag material having the vertical cells and reinforcing portion in one piece, it is desired that the airbag includes a gas admissive portion that is inflatable with inflation gas and a non-admissive portion that admits no inflation gas, that the non-admissive portion includes a vertical partitioning portion that extends vertically and defines boundaries of the vertical cells and a horizontal partitioning portion that extends from lower ends of the vertical partitioning portions in a generally horizontal direction, that each of the communication ports is provided between leading ends of the horizontal partitioning portions, and that the airbag material is folded back on a fold line extending on the horizontal partitioning portions.

With this configuration, since the turn or fold line of the airbag is comprised of the horizontal partitioning portions that admits no inflation gas and extend generally horizontally, the reinforcing portion is able to stay bent relative to the vertical cells at inflation and is deployed on the inboard side or outboard side of the lower end region of the airbag in a stable manner.

In this case, if furthermore each of the horizontal partitioning portions extends with an inclination relative to the horizontal direction such that the leading end thereof is directed upward, the vertical dimension of the reinforcing portion immediately below the communication port and proximate the leading ends of the horizontal partitioning portions is great whereas the vertical dimension immediately below the vertical partitioning portion and between the communication ports is small. In other words, at full inflation of the airbag, the reinforcing portion is formed into a shape like a series of a generally elliptical sphere which has a greatest diameter right below the communication port and is elongative in a horizontal direction, with constrictions between the communication ports (or at opposite ends of the elliptical spheres and immediately below the vertical partitioning portions). Moreover, since each of the communication ports is constricted, once the reinforcing portion is inflated to form the elliptical spheres above each of the communication ports at airbag inflation, the elliptical spheres prevent the airbag from unfolding in the vicinity of the communication ports, such that the reinforcing portion securely stays bent from the airbag (vertical cells) and deployed on the inboard side or outboard side of the lower end region of the airbag.

Moreover, it is desired that the airbag further includes at an intermediate position in an anteroposterior direction and between a pair of the vertical cells a panel portion that admits no inflation gas and is greater than the adjoining vertical cells in a width in an anteroposterior direction, that the reinforcing portion is located on lower end regions of the panel portion and the vertical cells located on the front and rear of the panel portion, and that the panel portion includes within an area thereof a supplementary inflatable portion that is in communication with the reinforcing portion.

With this configuration, since the supplementary inflatable portion located within the area of the panel portion inflates in such a manner as to be reduced in an anteroposterior width upon airbag deployment, a tensile force is generated on the airbag in an anteroposterior direction. Further, the fold line that turns up the reinforcing portion is so formed as to close off an inlet opening of the supplementary inflatable portion, such that the inner pressure of the supplementary inflatable portion, and thus the tensile force is maintained for an extended period of time.

In the airbag apparatus described above, if the reinforcing portion is so formed as to extend over an entire length in an anteroposterior direction of an inflatable area of the airbag, the lower end region of the inflatable area of the airbag is supported by the reinforcing portion all over the length in the anteroposterior direction.

It will also be appreciated to provide the reinforcing portion separately from the main body in which the vertical cells are situated and couple the reinforcing portion to the main body by peripheries of communication ports that are located proximate lower ends of the vertical cells.

In the head-protecting airbag apparatus configured as above, furthermore, if the reinforcing portion is deployable on the inboard side of the airbag, even in the event that the airbag (or vertical cells) as inflated is pushed outward by an occupant's head at a vertically intermediate position and the airbag becomes bent in a V-shape as viewed from front side such that the lower edge of the airbag overpasses the beltline of a door and ejects from the vehicle, the reinforcing portion is deployed on the inboard side of the lower edge of the airbag and covers the inboard side of a window trim arranged along the lower peripheries of windows, and thus prevents gapping between the trim and the airbag. Further, even if an occupant's head contacts the airbag and then slides down the inner surface of the airbag, the reinforcing portion receives and safeguards the head.

On the contrary, if the reinforcing portion is deployable on the outboard side of the airbag, a gap is hardly formed between the lower edge of the airbag and a window trim, such that the reinforcing portion is supported by the window trim and the lower end region of the airbag is supported by the reinforcing portion.

DESCRIPTION OF PREFERRED EMBODIMENTS

Preferred embodiments of the present invention are described below with reference to the accompanying drawings. However, the invention is not limited to the embodiments disclosed herein. All modifications within the appended claims and equivalents relative thereto are intended to be encompassed in the scope of the claims.

Figure 1:
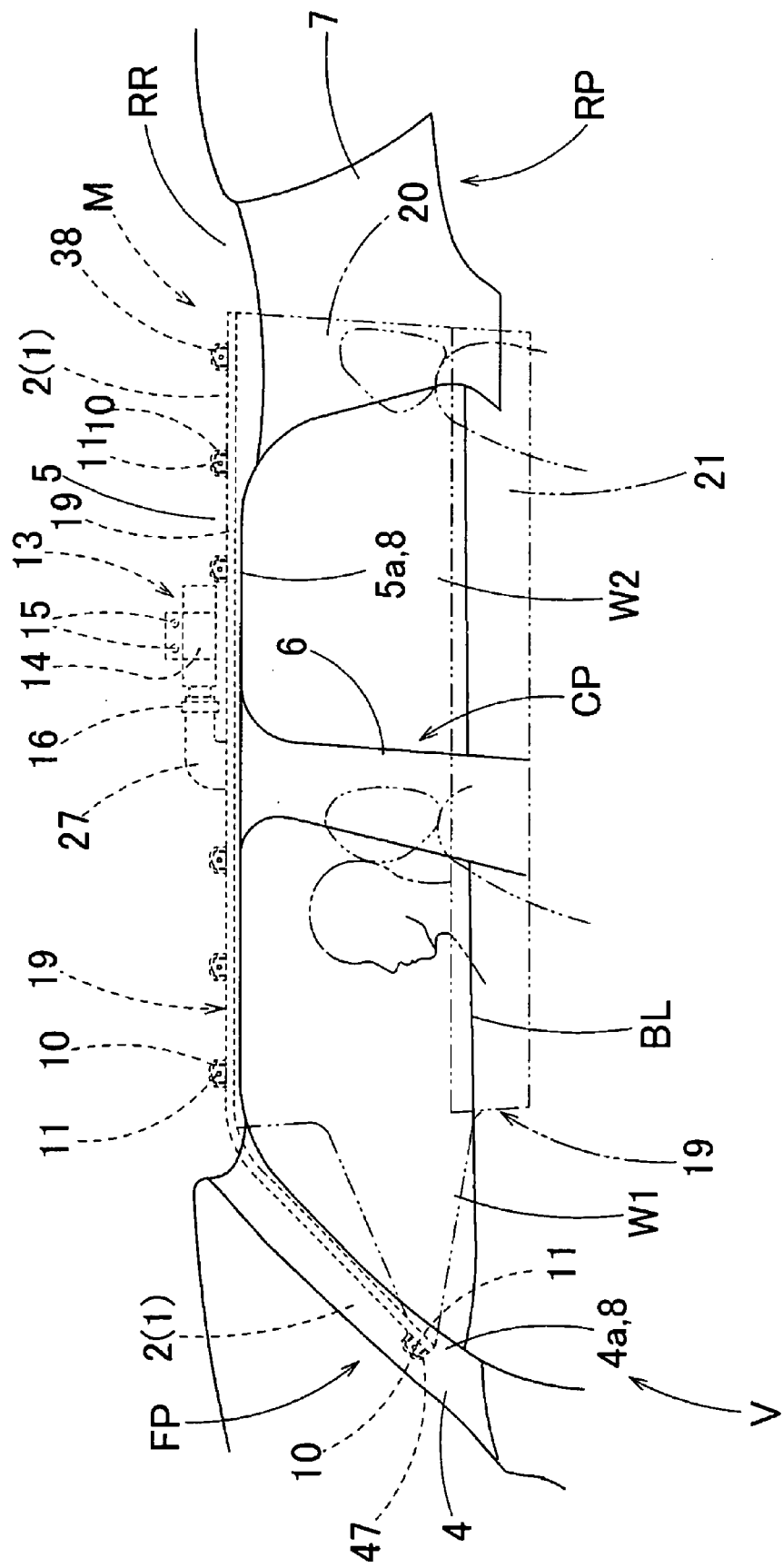
FIG. 1 is a schematic front view of a head-protecting airbag apparatus embodying the present invention, as viewed from the inboard side.

FIG. 1 depicts a head-protecting airbag apparatus M embodying the present invention. The head-protecting airbag apparatus M includes an airbag 19, an inflator 13, mounting brackets 10 and 14, and an airbag cover 8. The airbag 19 is housed on the upper periphery of the window (side windows W1, W2) of a vehicle V in a folded-up configuration, specifically from the lower periphery of the front pillar FP through the region above the rear pillar RP, via the lower periphery of the roof side rail RR, on the inboard side of the vehicle V.

Figure 6:
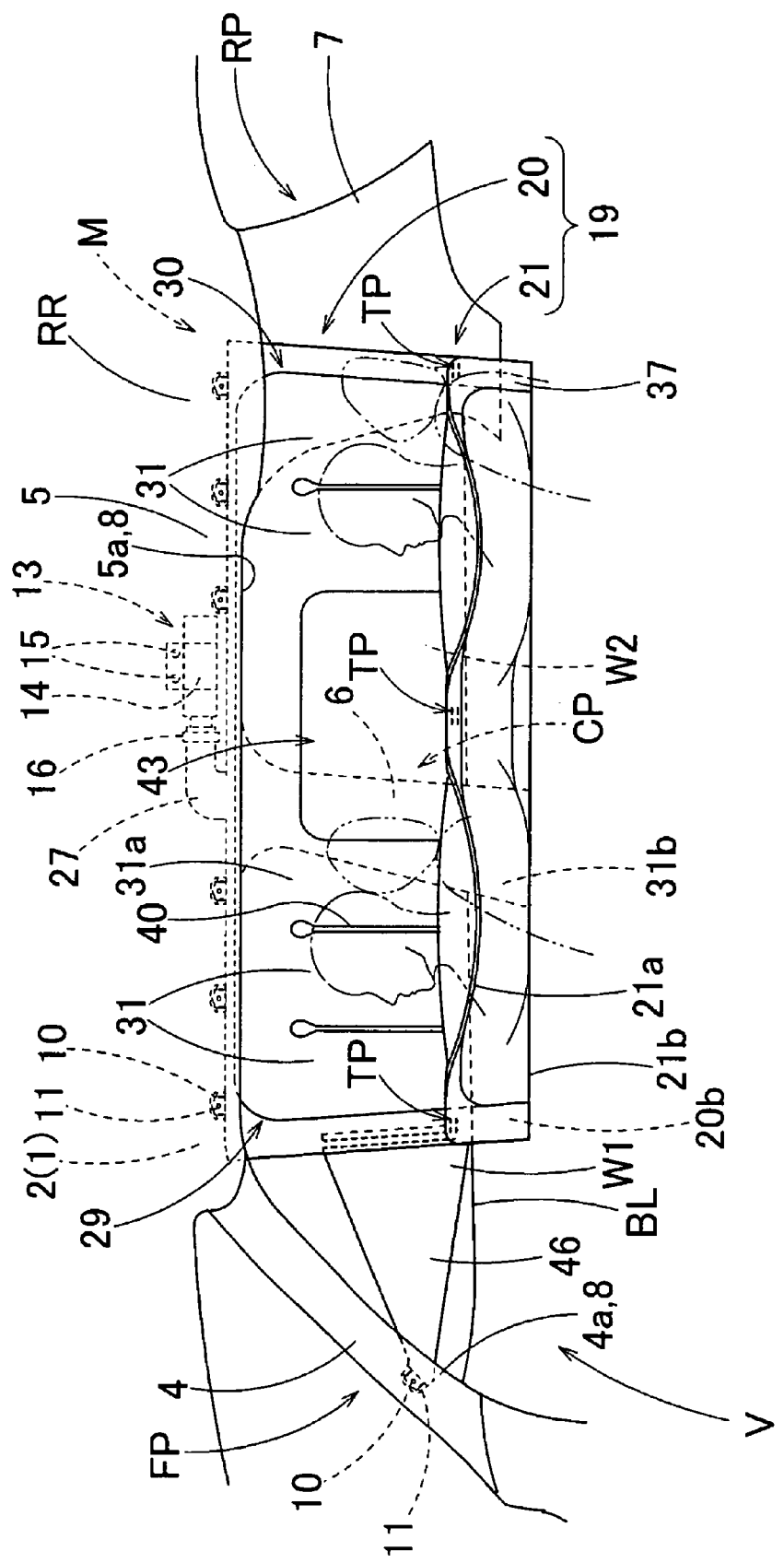
FIG. 6 is a schematic front view of the head-protecting airbag apparatus of FIG. 1 at full deployment of the airbag as viewed from the inboard side.
Figure 7:
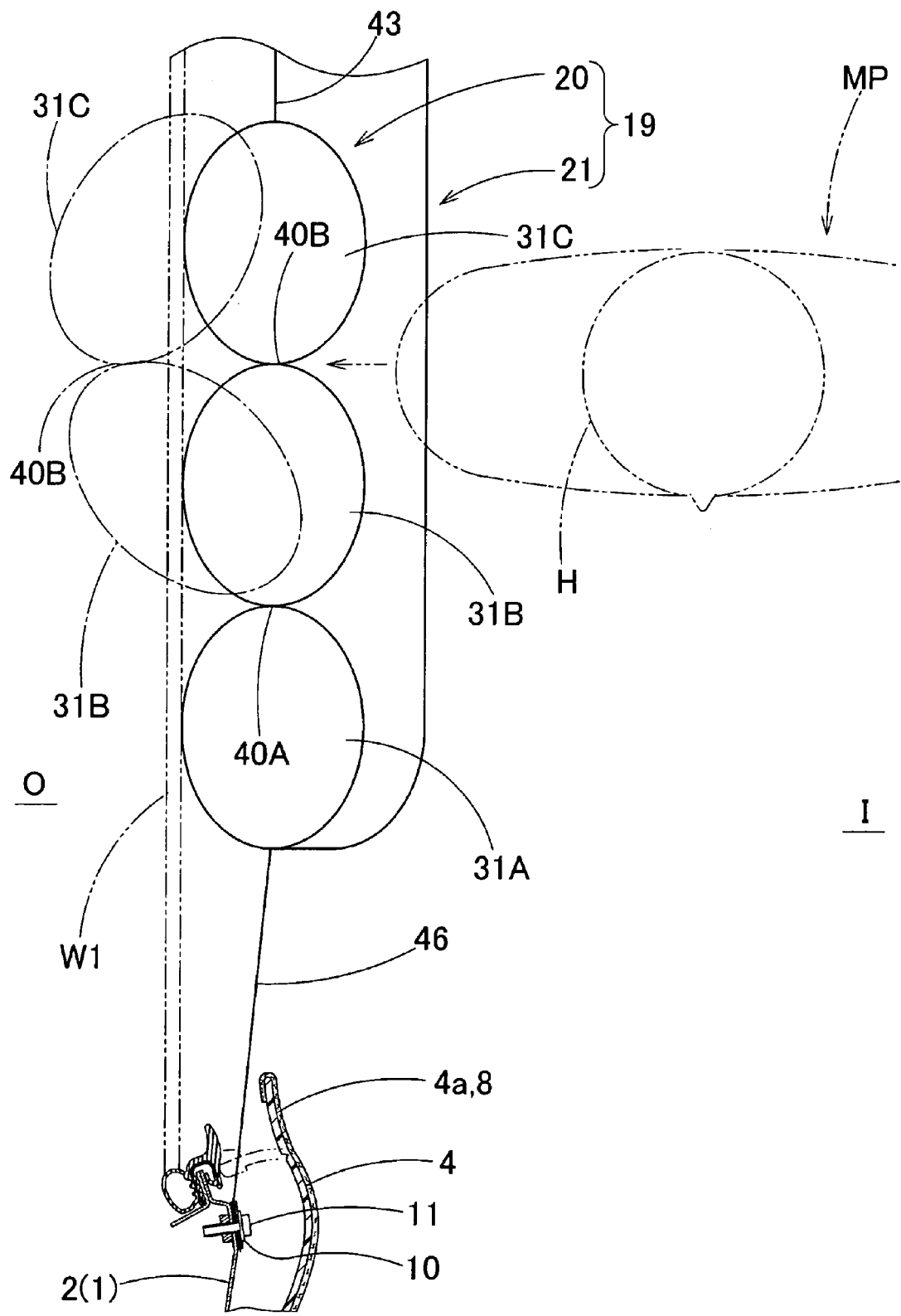
FIG. 7 is a schematic horizontal section of the airbag apparatus of FIG. 1 showing the airbag as inflated.
Figure 8:
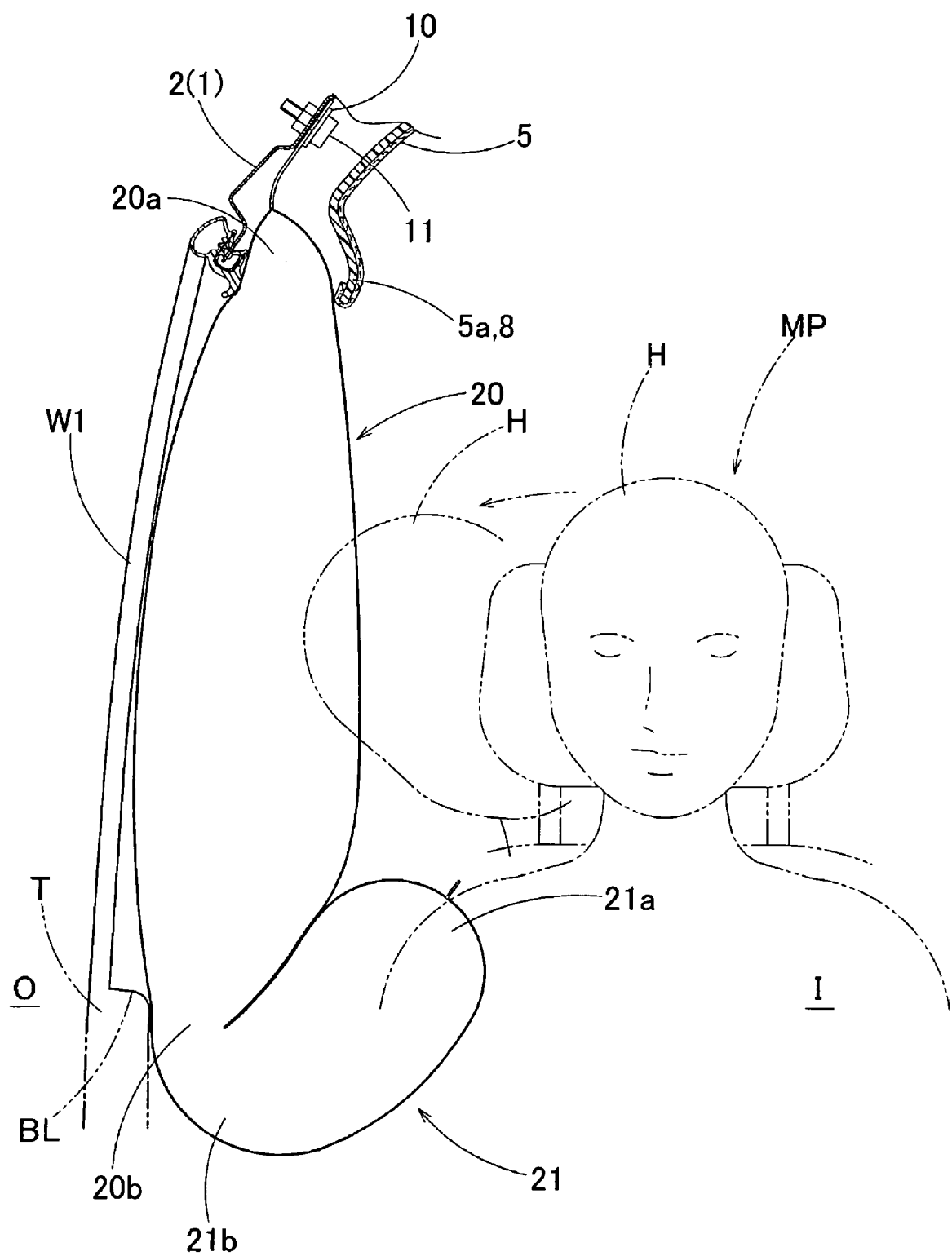
FIG. 8 is a schematic vertical section of the airbag apparatus of FIG. 1 showing the airbag as inflated.

As shown in FIGS. 1 and 6 to 8, the airbag cover 8 is constructed of a lower hem 4a of a front pillar garnish 4 arranged on the front pillar FP, and of a lower hem 5a of a roof head liner 5 arranged on the roof side rail RR. The front pillar garnish 4 and roof head liner 5 are fabricated of synthetic resin and secured to an inner panel 2 of the vehicle body structure 1 at the front pillar FP and roof side rail RR. The airbag cover 8 covers the inboard side of the airbag 19 and is so designed as to open toward the interior I when pushed by the airbag 19 under inflation and allow the airbag 19 to deploy into the interior I of the vehicle (FIGS. 7 and 8).

Referring to FIG. 1, the inflator 13 is substantially columnar in shape and includes at the leading end gas discharge ports (unillustrated) for discharging the gas into the airbag 19. The inflator 13 is coupled to the airbag 19 by the leading end region provided with the gas discharge ports and inserted into a later-described gas inlet 27 of the airbag 19. A clamp 16 is mounted around the rear end 27a of the gas inlet 27 to clamp the gas inlet 27 onto the leading end region of the inflator 13. The inflator 13 is secured to the inner panel 2 above the window W2 by a mounting bracket 14 mounted around the inflator 13 and mounting bolts 15.

Figure 2:
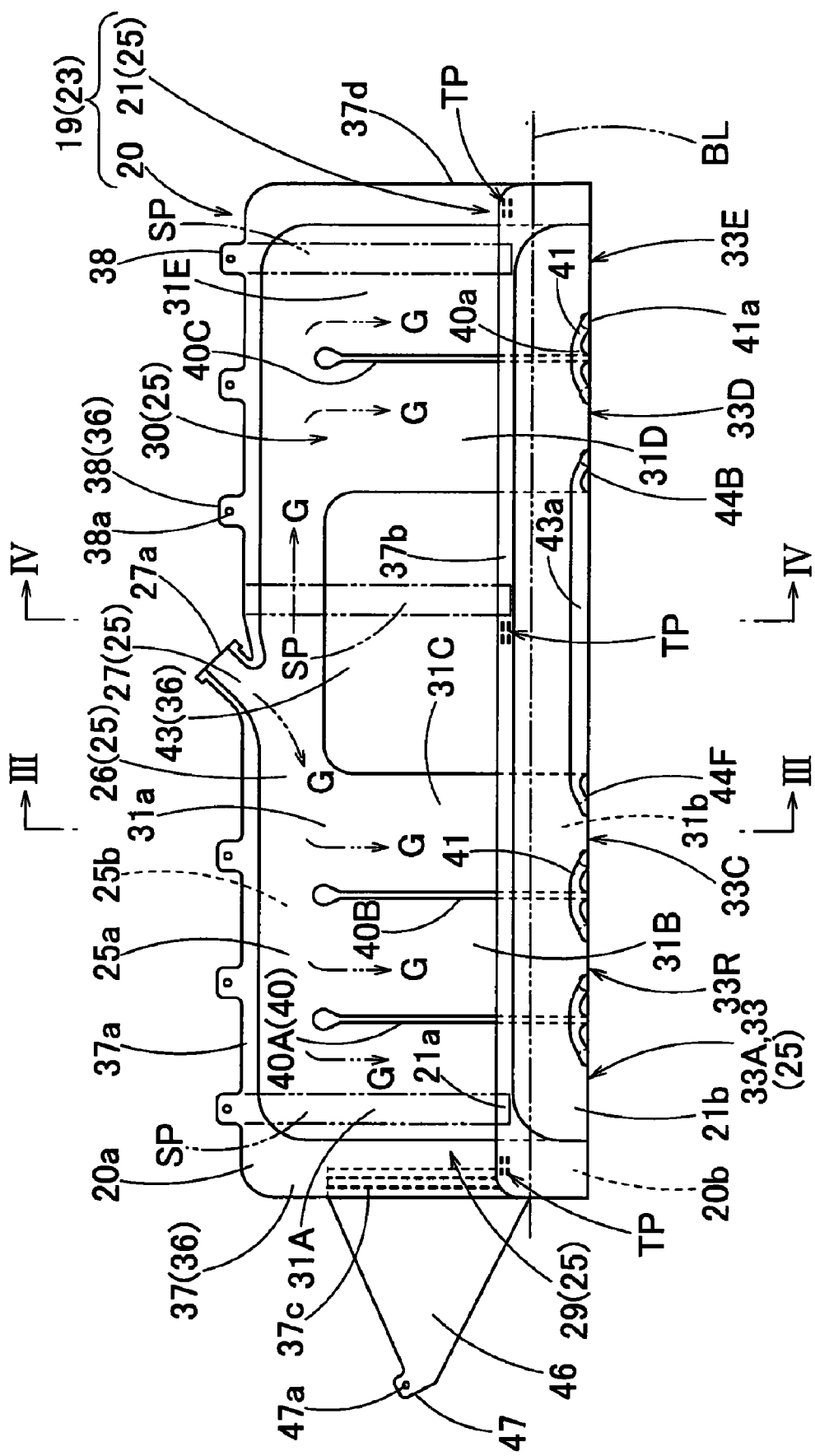
FIG. 2 is a front view of an airbag for use in the airbag apparatus of FIG. 1 as flattened.

Mounting brackets 10 are used to mount the airbag 19 to the inner panel 2. Each of mounting brackets 10 is comprised of a pair of plates of metal applied to inboard and outboard of each of later-described mounting portions 38 and 47 of the airbag 19, as shown in FIG. 2. The mounting brackets 10 together with the mounting portions 38 and 47 are secured to the inner panel 2 by bolts 11.

Figure 3:
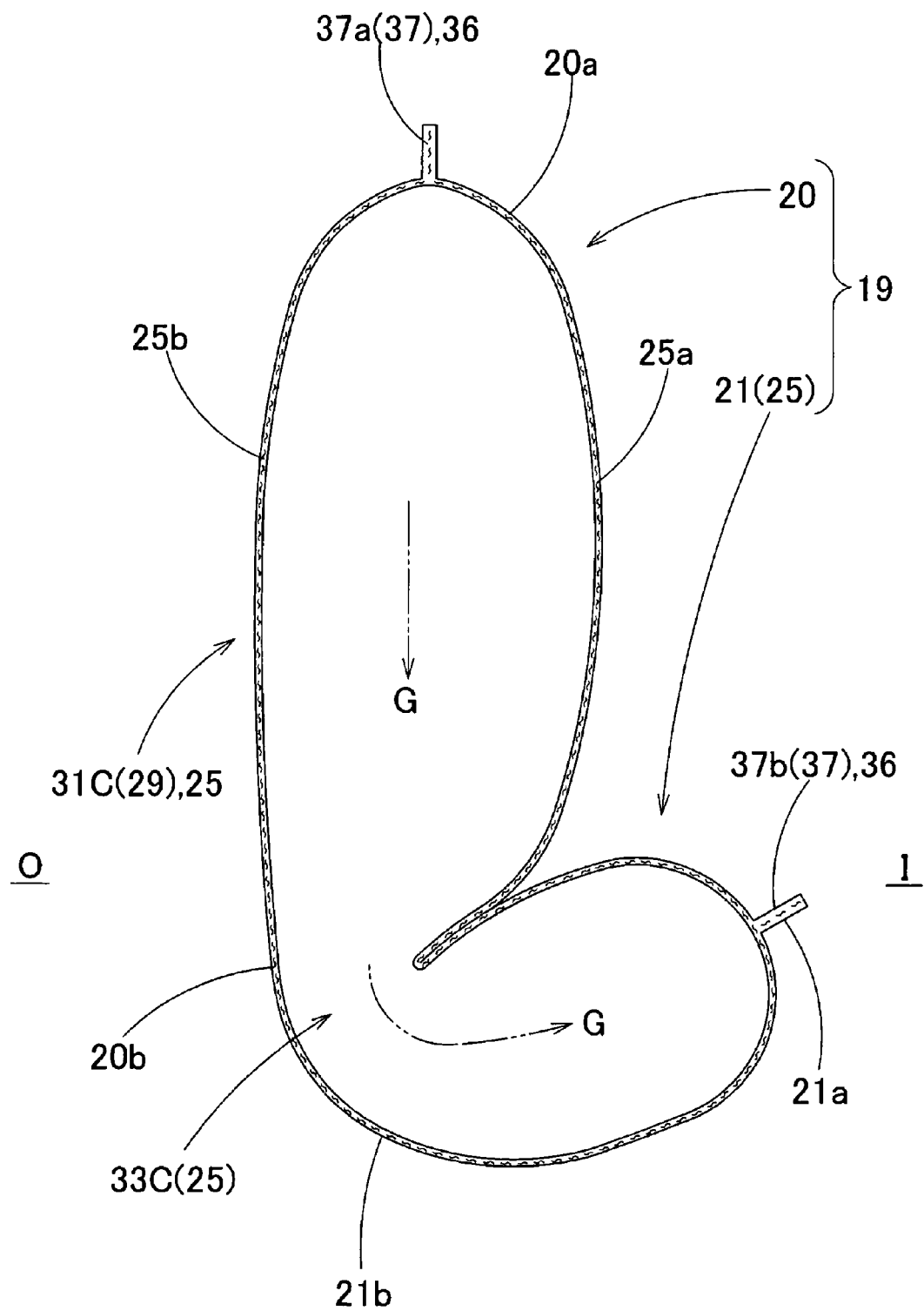
FIG. 3 is a vertical section of the airbag of FIG. 2 as inflated by itself, taken along line III-III of FIG. 2.
Figure 4:
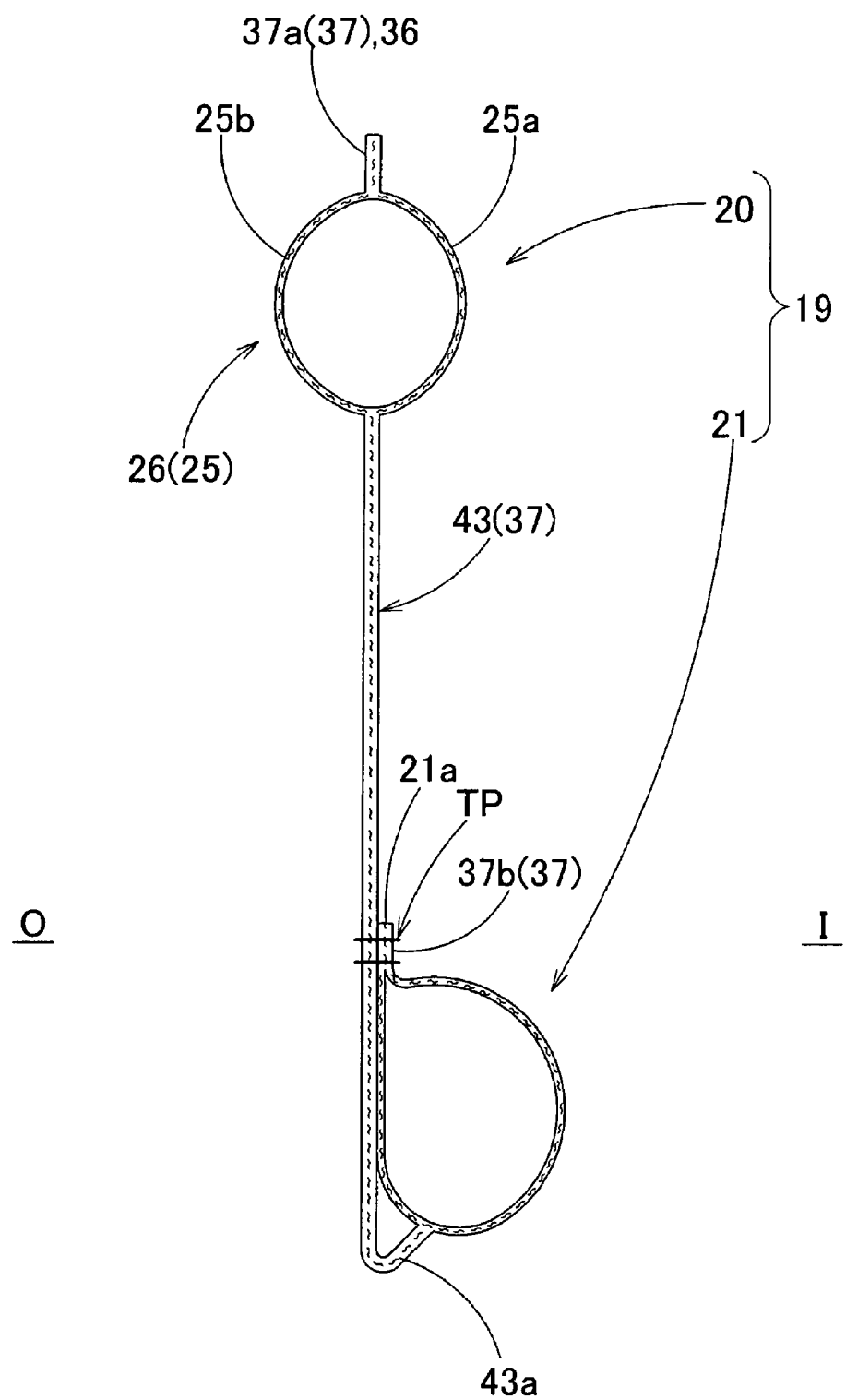
FIG. 4 is a vertical section of the airbag of FIG. 2 as inflated by itself, taken along line IV-IV of FIG. 2.

As shown in FIGS. 1 and 6 to 8, the airbag 19 is inflatable with inflation gas fed by the inflator 13 and unfolds and deploys to cover the inboard sides I of the windows W1, W2, pillar garnishes 6 and 7 arranged on the center pillar CP and rear pillar RP. As shown in FIGS. 2 to 4, the airbag 19 of this embodiment includes a main body 20 which covers the windows W1 and W2 at deployment and a reinforcing portion 21 located at the lower end 20b of and on the inboard side of the main body 20 at deployment. The main body 20 is inflatable into a generally rectangular plate shape lengthy in a horizontal direction such that it covers the window W1, center pillar CP, window W2 and up to the front region of the rear pillar RP. As shown in FIGS. 6 and 8, the vertical dimension of the main body 20 is so designed that the lower end region 20b at deployment is located on the beltline BL of the doors, i.e., on the lower edges of the windows W1 and W2. More specifically, in this specific embodiment, the lower end region 20b of the main body 20 is located below the beltline BL upon airbag deployment. As shown in FIGS. 2 and 6, the reinforcing portion 21 is inflatable into a rod-like shape extending in a horizontal direction. The longitudinal dimension of the reinforcing portion 21 is generally identical to that of the main body 20. In this specific embodiment, the reinforcing portion 21 is also deployable, on the inboard side I of the main body 20, such that the lower end region 21b is located below the beltline BL (FIGS. 6 and 8).

Figure 5:
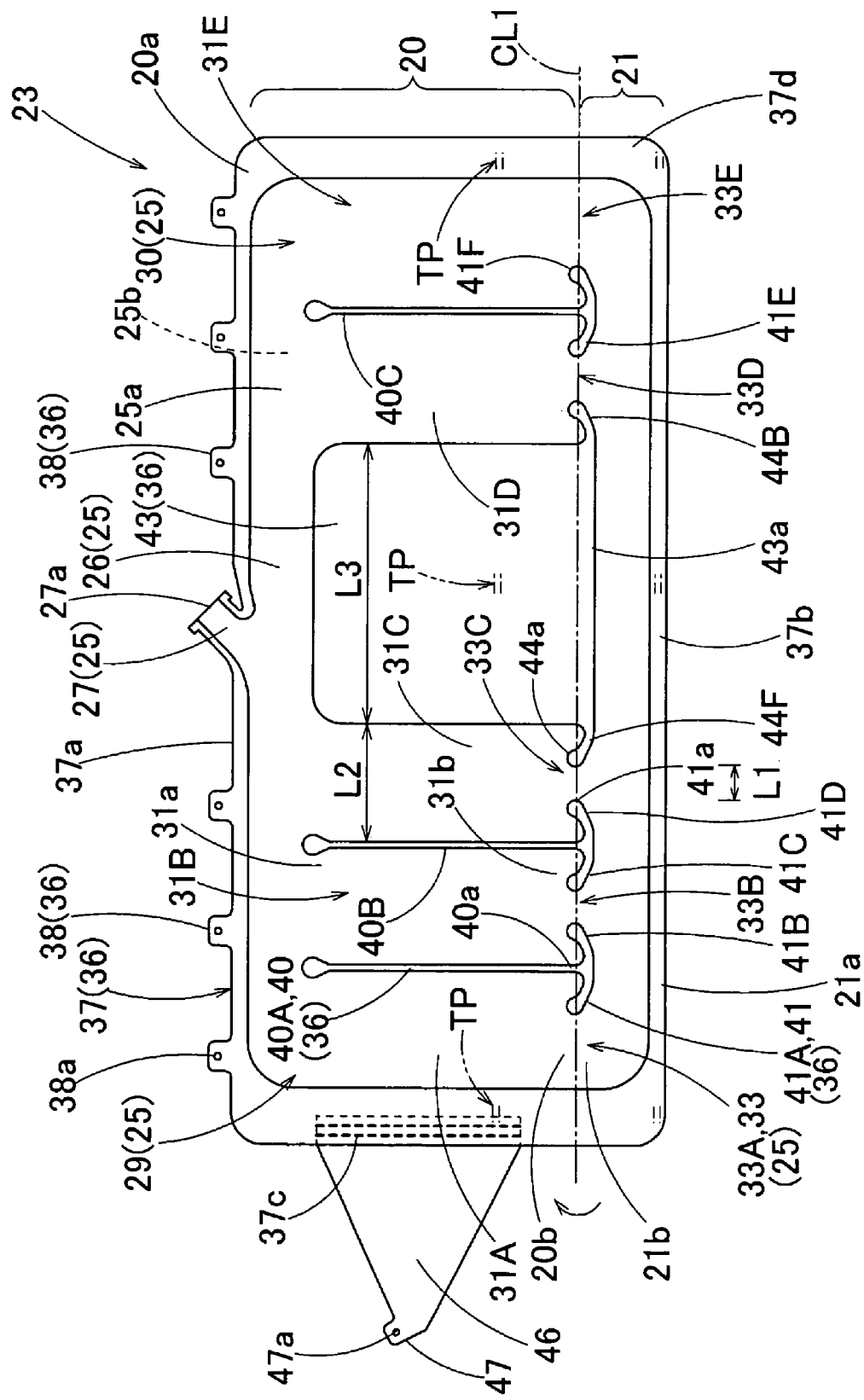
FIG. 5 is a front view of a material of the airbag of FIG. 2 as flattened.

As shown in FIG. 5, the airbag 19 is made of an airbag material 23 in which the main body 20 and reinforcing portion 21 are arranged continuously in a vertical direction. This airbag material 23 is bent at the boundary of the main body 20 and reinforcing portion 21 such that the reinforcing portion 21 is located on the inboard side and the upper end region 21a of the reinforcing portion 21 is sewn to the main body 20. That is, the airbag 19 is formed of the material 23 generally rectangular in shape and having the main body 20 and reinforcing portion 21 in one piece in such a manner that the lower end regions 20b and 21b at deployment are continuous. The airbag material 23 of this specific embodiment has a one-piece woven structure of polyamide yarn or the like. Furthermore, in this embodiment, the upper end region 21a of the reinforcing portion 21 is sewn to or coupled to the main body 20 by three seams TP located at front and rear ends and at the center in a longitudinal direction of the main body 20 (FIGS. 2 and 4).

As shown in FIGS. 2 to 5, the airbag 19 or airbag material 23 includes a gas admissive portion 25 inflatable with inflation gas by separating an inner wall 25a and an outer wall 25b and a non-admissive portion 36 that admits no inflation gas. The gas admissive portion 25 includes a gas feed path 26, a gas inlet 27, a first head-protecting portion 29, a second head-protecting portion 30, all which belong to the main body 20, a reinforcing portion 21, and a communication port 33 that communicates the main body 20 and the reinforcing portion 21. Since the reinforcing portion 21 is formed by bending the lower region of the airbag material 23 toward the inboard side, when the airbag 19 is fully inflated, the inner wall 25a of the reinforcing portion 21 is located on the outboard side or upper side whereas the outer wall 25b of the reinforcing portion 21 is located on the inboard side or lower side, as shown in FIGS. 3 and 4.

The gas feed path 26 is arranged in the longitudinal direction of the main body 20 (or of the airbag material 23) along the whole upper edge 20a (23a) of the main body 20 (the airbag material 23), and serves to guide the inflation gas G discharged from the inflator 13 into the first and second head-protecting portions 29 and 30 located below the gas feed path 26. At a position slightly to the rear from the longitudinal center of the gas feed path 26 is a gas inlet 27 connected with the inflator 13. The gas inlet 27 projects upward from the gas feed path 26, and is in gas communication with the gas feed path 26. In the illustrated embodiment, the gas inlet 27 opens toward its rear end 27a, As described above, the gas inlet 27 is mounted around the inflator 13 and connected to the inflator 13 with the clamp 16.

The first head-protecting portion 29 and second head-protecting portion 30 are disposed side by side along a longitudinal or anteroposterior direction in the main body 20. The first head-protecting portion 29 is deployable on a side of the front seat of a vehicle upon airbag deployment, to cover the inboard side I of a front part of the center pillar CP and the window W1 except its front end region, as shown in FIG. 6. The second head-protecting portion 30 is deployable on a side of the rear seat of a vehicle to cover the inboard side I of a rear half of the window W2. Each of the first and second head-protecting portions 29 and 30 includes a plurality of vertical cells 31 each of which is inflatable along a vertical direction in a rod-like shape. The vertical cells 31 are partitioned by later-described vertical partitioning portions 40 and dispose done behind another. In this specific embodiment, the first head-protecting portion 29 includes three vertical cells 31A, 31B and 31C whereas the second 30 includes two vertical cells 31D and 31E as best shown in FIG. 5. Each of the vertical cells 31 are communicated with the gas feed path 26 at the upper ends 31a, whereas communicated with the reinforcing portion 21 at the lower ends 31b, via later-described communication ports 33. The vertical cells 31 are partitioned by the partitioning portions 40 only in the area of the main body 20.

The communication ports 33 that communicate the main body 20 and reinforcing portion 21 are formed at the bottom 31b of each of the vertical cells 31, defined by later-described horizontal partitioning portions 41 extending from the lower ends 40a of the vertical portioning portions 40, later-described horizontal extending portions 44 extending from the bottom of a later-described panel portion 43 and a later-described peripheral portion 37. Specifically, as shown in FIG. 5, communication ports 33A and 33E formed at the bottom of the foremost vertical cell 31A of the first head-protecting portion 29 and rear vertical cell 31E of the second head-protecting portion 30 are respectively provided between the peripheral portion 37 defining the outer circumferential edge of the airbag material 23 and horizontal partitioning portions 41A and 41F extending forward or rearward from the lower ends 40a of the vertical partitioning portions 41A and 41F. Communication ports 33C and 33D formed at the bottom of rearmost vertical cell 31C of the first head-protecting portion 29 and front vertical cell 31D of the second head-protecting portion 30 are respectively provided between horizontal extending portions 44F and 44B extending forward or rearward from the bottom 43a of the panel portion 43 and horizontal partitioning portions 41D and 41E extending forward or rearward from the lower ends 40a of the vertical partitioning portions 40B and 40C. The communication port 33B formed at the bottom of the middle vertical cell 31B of the first head-protecting portion 29 is provided between the horizontal partitioning portions 41B and 41C respectively extending forward and rearward from the lower ends 40a of the vertical partitioning portions 40A and 40B. As shown in FIG. 5, each communication port 33A, 33B, 33C, 33D and 33E is so designed that the dimension L1 of the opening in an anteroposterior direction is smaller than the width L2 in an anteroposterior direction of each of the vertical cells 31A, 31B, 31C, 31D and 31E.

The reinforcing portion 21 is arranged along the lower edge of the airbag material 23 over the entire length in an anteroposterior direction of the airbag material 23. Specifically, as shown in FIG. 5, the reinforcing portion 21 is defined by the peripheral portion 37, the horizontal partitioning portions 41 extending from the lower ends of the vertical partitioning portions 40 and the panel portion 43. The reinforcing portion 21 is inflatable into a horizontal rod-like shape with the communication ports 33 located at the lower end region 21b and in such a manner as to cover the inboard side I of the lower end region 20b of the main body 20 entirely. That is, the inflatable portion 21 is designed to extend across all the vertical cells 31A, 31B, 31C, 31D and 31E. Since the reinforcing portion 21 is sewn to the main body 20 only by three seams TP separated from one another in an anteroposterior direction, the reinforcing portion 21 is so deployable that part of the upper end region 21a remote from the seams TP is directed toward the interior I of the vehicle, as if slightly opened, upon airbag deployment (FIGS. 3 and 6).

The non-admissive portion 36 includes a peripheral portion 37 defining the periphery of the airbag material 23, mounting portions 38 extending upward from the upper edge of the peripheral portion 37, the vertical partitioning portions 40 formed within the first and second head-protecting portions 29 and 30 of the main body 20, the horizontal partitioning portions 41 extending from the lower ends 40a of the vertical partitioning portions 40 for dividing the main body 20 and reinforcing portion 21 and a panel portion 43 located between the first and second head-protecting portions 29 and 30.

The peripheral portion 37 is so provided as to enclose the gas admissive portion 25 and constitutes the outer periphery of the airbag material 23. At airbag deployment, the peripheral portion 37 forms the outer periphery of the airbag 19 except the lower edges 20b and 21b of the main body 20 and reinforcing portion 21. The mounting portions 38 are provided in plurality along a longitudinal direction of the upper edge 20a of the main body 20 or the top region 37a of the peripheral region 37. The mounting portions 38 serve to secure the upper edge 20a of the main body 20 to the vehicle body structure 1 and thus mounting the airbag 19 on the vehicle. The airbag 19 of this specific embodiment includes six mounting portions 38 and each of the mounting portions 38 is provided with an insert hole 38a for receiving the mounting bolt 11 for attachment to the inner panel 2 of the vehicle body structure 1. Each of the mounting portions 38 is secured to the inner panel 2 by the mounting bolt 11 and the mounting bracket 10 described above.

Each of the vertical partitioning portions 40 is stick-shaped extending in a vertical direction and serves to partition the first and second head-protecting portions 29 and 30 into the vertical cells 31. The first head-protecting portion 29 has two vertical partitioning portions 40A and 40B whereas the second 30 includes one vertical partitioning portion 40C.

Each of the horizontal partitioning portions 41 extends generally horizontally or in an anteroposterior direction from the lower ends 40a of the vertical partitioning portions 40. In the illustrated embodiment, each of the horizontal partitioning portions 41 has a slight inclination relative to a horizontal direction such that the leading end 41a is directed upward. Thus at each of bottoms of the vertical partitioning portions 40, a pair of the horizontal partitioning portions 41 forms a V-shape as shown in FIG. 5. The horizontal partitioning portions 41 partition the main body 20 and reinforcing portion 21 while providing the communication ports 33 in between, or between the horizontal partitioning portions 41 and the horizontal extending portions (horizontal partitioning portion) 44 of the panel portion (vertical partitioning portion) 43.

The panel portion 43 is part of the vertical partitioning portion. It is generally rectangular in shape and located between the first and second head-protecting portions 29 and 30 as well as between the gas feed path 26 and reinforcing portion 21. That is, in the main body 20 as fully inflated, the panel portion 43 is deployed below the gas feed path 26 and between the first and second head-protecting portions 29 and 30. As shown in FIG. 5, the width L3 in an anteroposterior direction of the panel portion 43 is greater than the width L2 in an anteroposterior direction of the vertical cells 31. The panel portion 43 includes at the lower edge 43a horizontal extending portions 44F and 44B extending forward and rearward in a stick-like manner. The horizontal extending portions 44F and 44B also constitute the horizontal partitioning portions, and alike the horizontal partitioning portions 41, extend with a slight inclination relative to a horizontal direction such that the leading ends 44a are directed upward. The inclination of the horizontal extending portions 44F and 44B relative to the horizontal direction is generally identical to that of horizontal partitioning portions 41.

As best shown in FIG. 5, the airbag 19 further includes at the front end of the main body 20 a joint belt 46 prepared separately from the airbag material 23. The joint belt 46 is made of a fabric woven of polyamide yarn, polyester yarn or the like similarly to the airbag material 23. The joint belt 46 is sewn to the lower front end of the main body 20 by the root region formed wide, and has a mounting portion 47 at the leading end. Similarly to the mounting portions 38 described above, the mounting portion 47 includes an insert hole 47a for receiving the mounting bolt 11 and is secured to the inner panel 2 of the vehicle body structure 1 by the mounting bracket 10 and the mounting bolt 11. More specifically, the mounting portion 47 is secured to the bottom region of the front pillar FP of the inner panel 2 as shown in FIG. 1, which position is below the locations of the mounting portions 38 secured to the roof side rail RR on the upper peripheries of the windows W1 and W2.

Manufacturing of the airbag 19 is started by coupling the joint belt 46 to the airbag material 23. Then the airbag material 23 is flattened and folded on a fold line CL1 indicated by a double-dashed line in FIG. 5 which extends along a longitudinal or anteroposterior direction in such a manner as to connect the leading ends 41a of the horizontal partitioning portions 41 and leading ends 44a of the horizontal extending portions 44 of the panel portion 43, such that the reinforcing portion 21 is located on the inboard side of the main body 20. Subsequently, overlapped portions are partially sewn together by sewing threads. Specifically, the lower region 37b of the peripheral portion 37 (the upper edge 21a of the reinforcing portion 21) are sewn to the main body 20 by three seams TP, i.e., to the front region 37c and rear region 37d of the peripheral portion 37 and to the panel portion 43 located generally in the middle of the longitudinal direction of the main body 20. The fold line CL1 is formed at a position where the opening dimension of the communication ports 33 in the airbag material 23 is smallest and slightly above the lower edge 43a of the panel portion 43.

Mounting of the airbag apparatus M on a vehicle V is now described. Firstly, the airbag 19 as flattened is folded up on creases extending along a longitudinal direction in such a manner as to bring the lower end 20b close to the upper end 20a. When folded up, the airbag 19 is wrapped up by an unillustrated breakable wrapping member at predetermined positions for keeping the folded-up configuration. Subsequently, the mounting brackets 10 are attached to the mounting portions 38 and 47, and the inflator 13 is connected to the gas inlet 27 with the clamp 16. Then the bracket 14 is mounted around the inflator 13, and thus forming an airbag module.

Thereafter, the mounting brackets 10 and 14 are located at predetermined positions of the inner panel 2 and fixed thereto with the bolts 11 and 15. Then, an unillustrated lead wire extending from a suitable control for actuating the inflator is connected to the inflator 13. If then the front pillar garnish 4, the roof head liner 5, and further the pillar garnishes 6 and 7 are attached to the vehicle body 1, the head-protecting airbag apparatus M is mounted on the vehicle V.

When the inflator 13 is actuated after the airbag apparatus M is mounted on the vehicle V, the inflation gas G discharged from the inflator 13 flows into the airbag 19, and the airbag 19 then breaks the wrapping member, pushes and opens the airbag cover 8 constructed of the lower edges 4a and 5a of the front pillar garnish 4 and roof head liner 5, and deploys downward and covers the inboard side of the windows W1, W2, the center pillar CP, and the rear pillar RP, as shown in FIG. 1 (double-dashed lines) and FIGS. 6 to 8. In this embodiment, as shown in FIGS. 2 and 3, inflation gas G discharged from the inflator 13 flows into the vertical cells 31 of the first and second head-protecting portions 29 and 30 via the gas inlet 27 and feed path 26, and then flows into the reinforcing portion 21 via the communication ports 33 formed at the bottoms 31b of the vertical cells 31.

Although the airbag 19 of the foregoing embodiment has a plurality of vertical cells 31 inflatable in a vertical rod-shape and disposed side by side in an anteroposterior direction, the airbag 19 further includes the reinforcing portion 21 that is located on the inboard side I of the lower end region 20b of the main body 20 and extends in a horizontal direction in a rod-like shape at airbag deployment. The reinforcing portion 21 is formed to extend across all the vertical cells 31A, 31B, 31C, 31D and 31E in the vicinity of the lower ends 31b of the vertical cells 31 (FIGS. 6 and 8). The reinforcing portion 21 acts like a supporting plate for the vertical cells 31A, 31B, 31C, 31D and 31E and prevents the main body 20 of the airbag 19 from bending in a V-shape as viewed from above as indicated by double-dashed lines in FIG. 7 even in the event that a pressure of a head H of an occupant MP moving outward is applied on one of boundaries of the vertical cells 31 (or on one of the vertical partitioning portions 40A/40B/40C) upon rollover or the like.

More specifically, since the reinforcing portion 21 is located on the inboard side I of the vertical cells 31, when the occupant's head H bumps against a boundary of the vertical cells 31 and pushes same outward, the reinforcing portion 21 prevents ends of the vertical cells 31 facing away from the boundary from moving inward and thus prevents the boundary of the vertical cells 31 or vertical partitioning portion 40 from moving outward. Consequently, the airbag apparatus M of the foregoing embodiment prevents such a deformation of the airbag 19 (or main body 20) as to cause the lower end region 20b of the main body 20 overpass the beltline BL of a door and eventually eject from the vehicle, and therefore, the lower end region 20b of the main body 20 is well supported by the beltline BL and the main body 20 supported by the beltline BL is able to properly protect an occupant's head H while preventing outward movement of the same.

Therefore, the head-protecting airbag apparatus M prevents ejection of an occupant's head H securely in the event of rollover.

The airbag 19 of the foregoing embodiment is manufactured by folding back the airbag material 23 having the reinforcing portion 21 below the vertical cells 31 on the fold line CL1 extending along the boundary of the vertical cells 31 and the reinforcing portion 21 and then coupling overlapped portions by the sewn seams TP provided partially. That is, the airbag 19 can be manufactured by simply bending the airbag material 23 in which the vertical cells 31 and reinforcing portion 21 are integral on the fold line CL1 extending along the boundary of the vertical cells 31 and reinforcing portion 21 and coupling the same together by the seams TP, which will facilitate manufacturing of an airbag 19 in comparison with an instance where the reinforcing portion is prepared separate from the vertical cells.

Moreover, extending across an entire anteroposterior length of the inflatable area of the airbag 19, i.e., of the main body 20, the reinforcing portion 21 supports the lower end region 20b of the main body 20 over an entire anteroposterior area. If this advantage does not have to be considered, the reinforcing portion may be arranged on a partial anteroposterior area of the main body 20Y as in a later-described airbag 50. Further alternatively, the reinforcing portion may be arranged only on an area of two adjoining vertical cells deployable at a side of an occupant's head.

In the airbag apparatus M, moreover, the communication ports 33 which communicate the main body 20 and the reinforcing portion 21 are formed between leading ends of a pair of the horizontal partitioning portions 41 (horizontal extending portions 44) that extend to the front or rear from the lower ends 40a (43a) of the vertical portioning portions 40 (panel portion 43), and the airbag material 23 is bent at the horizontal partitioning portions 41 (horizontal extending portions 44). That is, since the turn or fold line of the airbag 19 is comprised of the horizontal partitioning portions 41 (horizontal extending portions 44) that admits no inflation gas and extend generally horizontally, the reinforcing portion 21 is able to stay bent relative to the main body 20 even at inflation and is deployed on the inboard side I of the lower end region 20b of the main body 20 in a stable manner.

Especially in the foregoing embodiment, the fold line CL1 of the airbag material 23 is formed to pass through the lower edge 43a of the panel portion 43 which is part of the non-admissive portion 36 as well as the horizontal partitioning portions 41. That is, the non-admissive portion 36 occupies a considerable part of the fold line. This configuration prevents the fold from unfolding along with inflation of the airbag 19 and thus prevents part of the upper edge 21a of the reinforcing portion 21 remote from the seams TP from largely opening downward in such a manner as to face away from the main body 20, although the reinforcing portion 21 is formed into such an elongative contour as to cover the main body 20 all over the length and sewn to the main body 20 only by three seams TP. However, it will also be appreciated to form the fold line of the airbag material 23 on an area of which an inflatable portion of the airbag occupies a larger part, for example on a line on the reinforcing portion passing by the panel portion of the airbag material. In such an instance, increasing the number of seams that sew the upper end region of the reinforcing portion to the main body will assure proper deployment of the reinforcing portion, on the inboard side of the lower end region of the main body.

Figure 9:
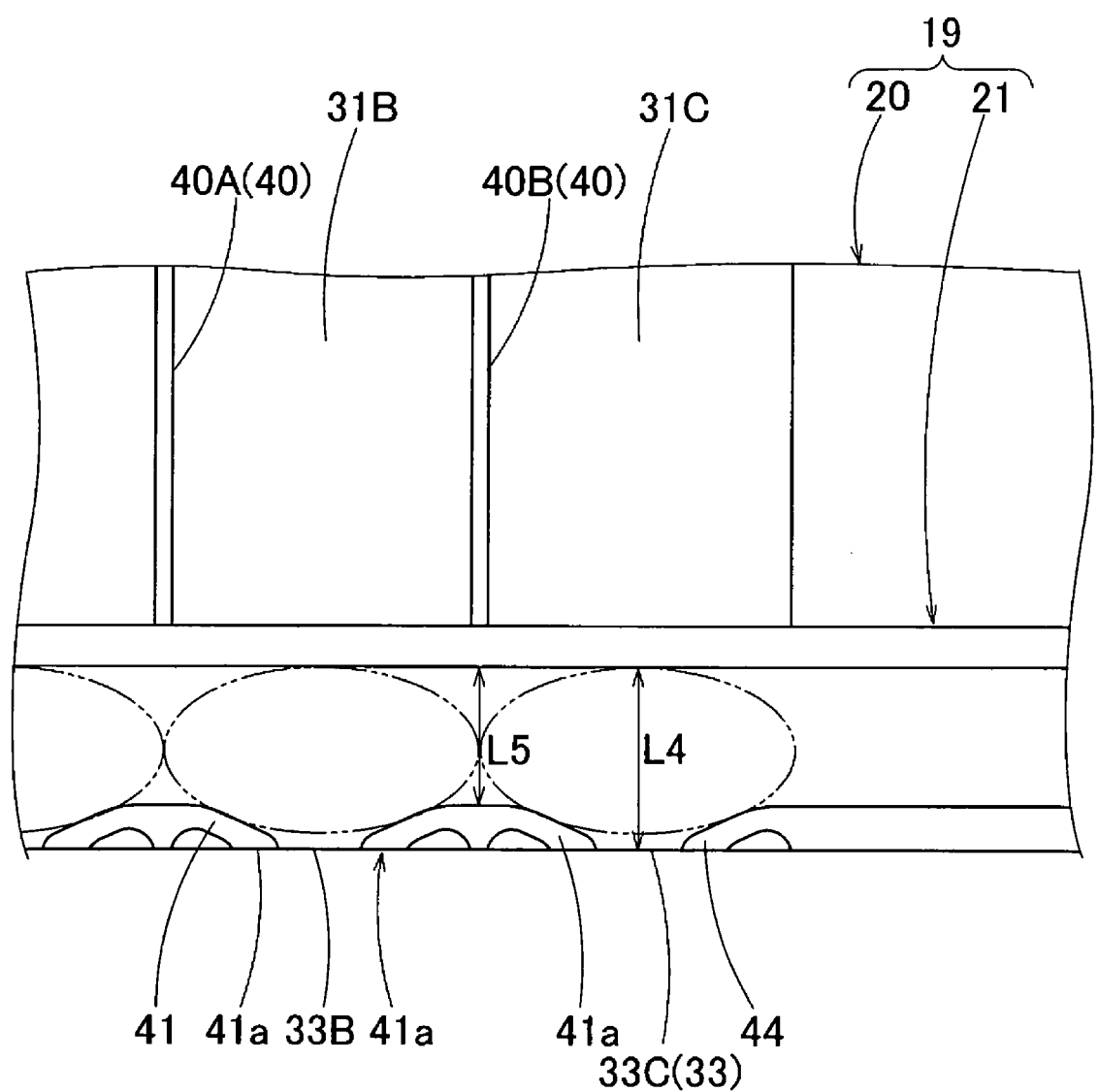
FIG. 9 is a schematic partial enlarged front view of the reinforcing portion as inflated.

In the airbag apparatus M, furthermore, each of the horizontal partitioning portions 41 and 44 extends with an inclination relative to a horizontal direction such that the leading end 41a/44a is directed upward. With this configuration, referring to FIG. 9, the vertical dimension L4 of the reinforcing portion 21 immediately below the communication port 33 is great whereas the vertical dimension L5 immediately below the vertical partitioning portion 40 is small. In other words, at full inflation of the airbag 19, the reinforcing portion 21 is formed into a shape like a series of a generally elliptical sphere, as indicated by double-dashed lines in FIG. 9, which elliptical sphere has a greatest diameter right below the communication port 33 and is elongative in a horizontal direction, with constrictions between the communication ports 33 (or at opposite ends of the elliptical spheres and immediately below the vertical partitioning portions 40). Moreover, since each of the communication ports 33 is constricted, once the reinforcing portion 21 is inflated to form the elliptical spheres above each of the communication ports 33 at airbag inflation, the elliptical spheres prevent the airbag 19 from unfolding at the fold line CL1, such that the reinforcing portion 21 securely stays bent from the main body 20 and deployed on the inboard side I of the lower end region 20b of the main body 20. If not considering such an advantage, the horizontal partitioning portions may be formed straightly along a horizontal direction.

In the foregoing embodiment, the airbag 19 is so designed that the reinforcing portion 21 deploys on the inboard side I of the airbag 19 or main body 20. With this configuration, even in the event that the main body 20 (or vertical cells 31) as inflated is pushed outward by an occupant's head H at a vertically intermediate portion and the main body 20 becomes bent in a V-shape as viewed from front side such that the lower edge 20b of the main body 20 overpasses the beltline BL and moves outward, the reinforcing portion 21 is deployed on the inboard side I of the lower edge 20b of the main body 20 and covers the inboard side I of a window trim T (FIG. 8) arranged along the lower peripheries of the windows W1 and W2, and thus prevents gaping between the trim T and the airbag 19. Further, even if an occupant's head H contacts the main body 20 and then slides down the inner surface of the main body 20, the reinforcing portion 21 receives and safeguards the head H.

Figure 10:
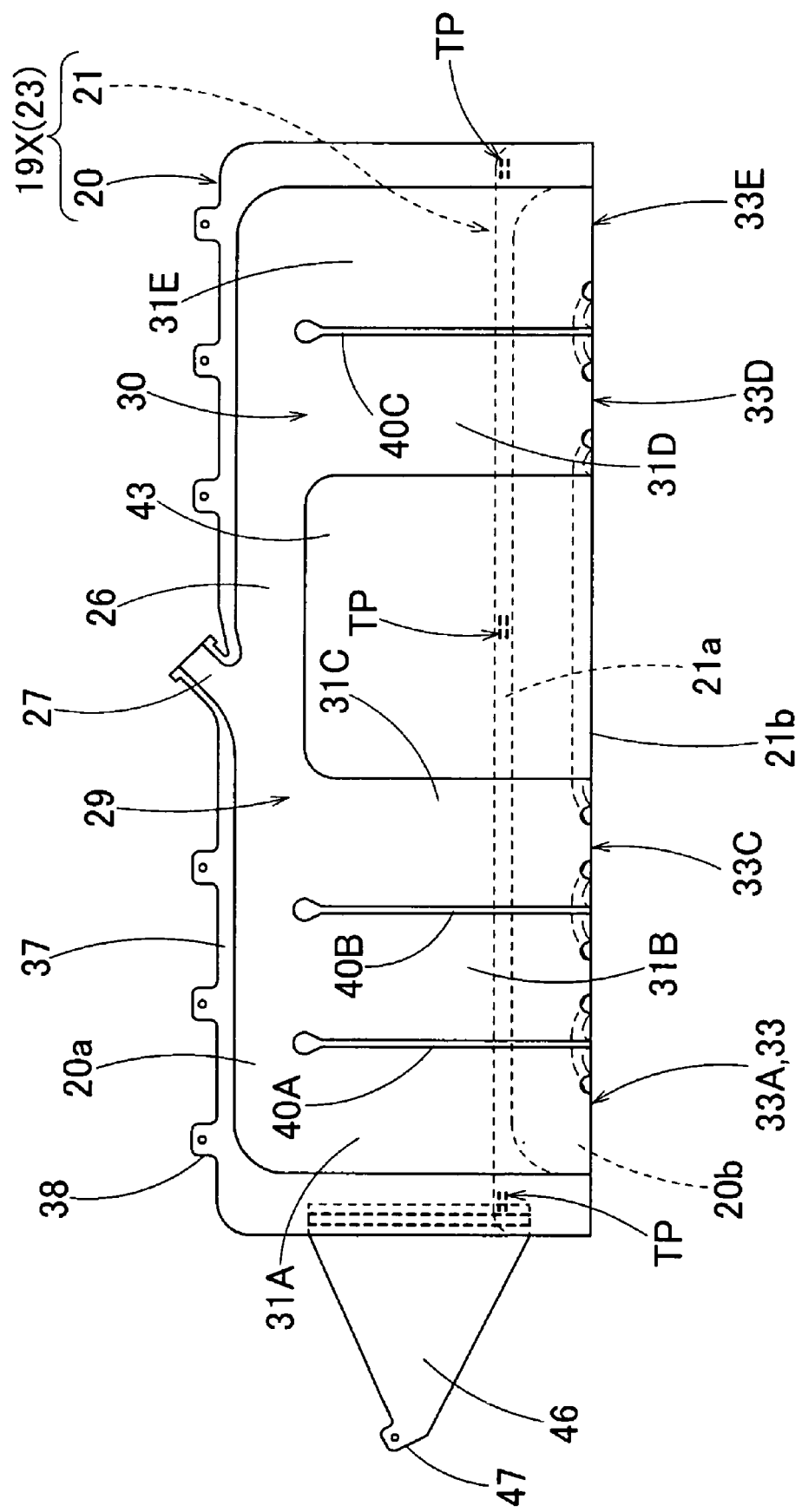
FIG. 10 is a front view of an airbag according to an alternative embodiment as flattened.
Figure 11:
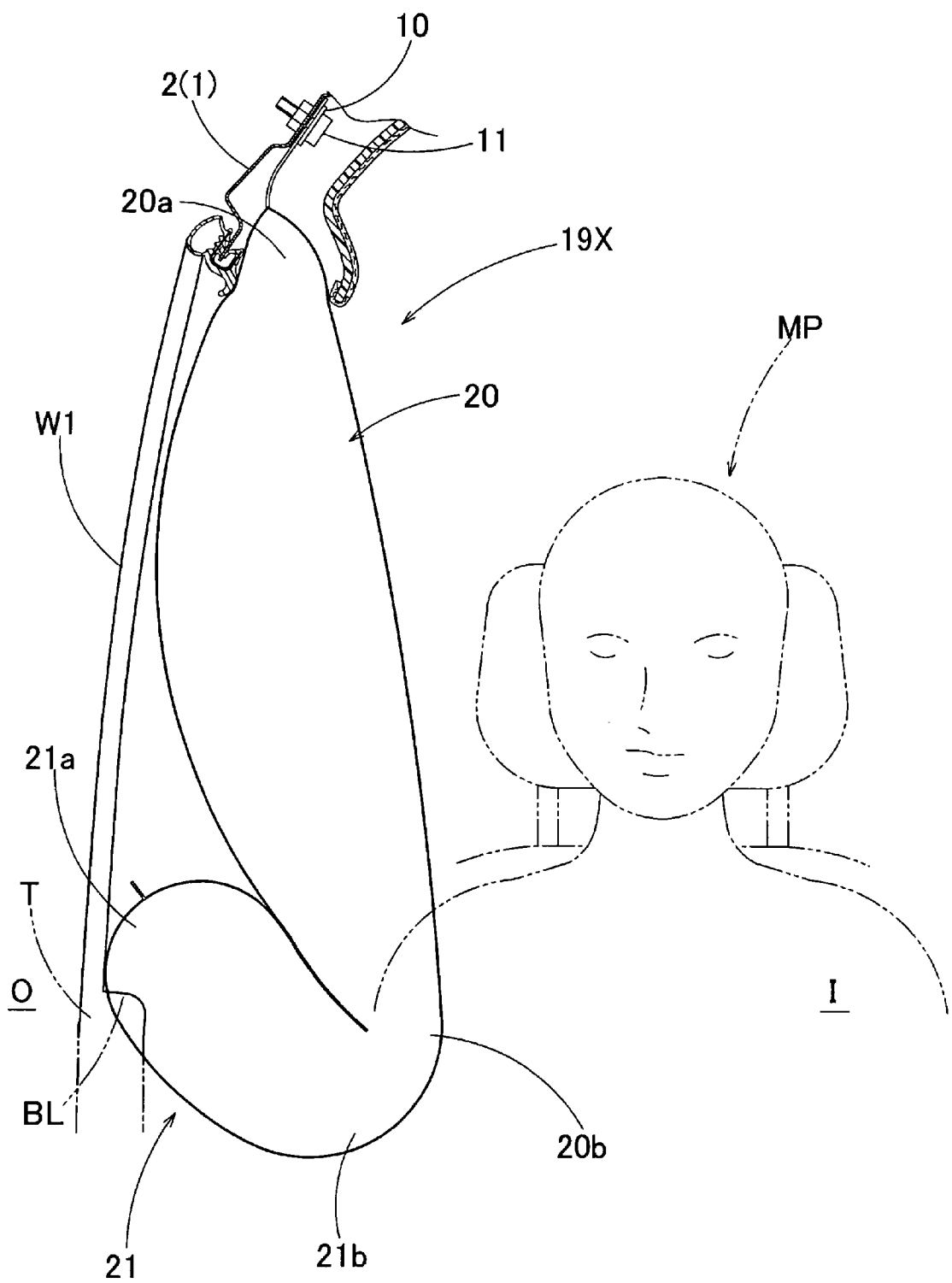
FIG. 11 is a schematic vertical section of the airbag of FIG. 10 as mounted on a vehicle and inflated.

It will also be appreciated that the reinforcing portion 21 is located on the outboard side O of the main body 20 as an airbag 19X depicted in FIGS. 10 and 11. The reinforcing portion 21 of this airbag 19X is formed by folding back the airbag material 23 described above toward the outboard side and sewing overlapped portions together at three points in an anteroposterior direction as in the foregoing embodiment.

In the airbag 19X thus configured, the reinforcing portion 21 is deployed to extend across the vertical cells 31 on the outboard side O of the lower end regions 31b of the vertical cells 31. Accordingly, in the event that a pressure is applied to one of the boundaries of the adjoining vertical cells 31 (i.e., to one of the vertical partitioning portion 40) by an occupant's head H upon rollover or the like, the reinforcing portion 21 located on the outboard side O prevents the boundary portion (the vertical partitioning portion 40) from moving outward. That is, the airbag 19X is also prevented from overpassing the beltline BL of a vehicle door at the lower end region 20b, such that the lower end region 20b of the airbag 19X (main body 20) is well supported by the beltline BL and thus the main body 20 supported by the beltline BL properly prevents ejection of the head H of an occupant MP.

As shown in FIG. 11, moreover, since the reinforcing portion 21 of the airbag 19X is located on the outboard side of the main body 20, a gap is hardly formed between the lower edge of the airbag 19X and a window trim T arranged along the lower peripheries of the windows W1 and W2 upon airbag deployment, such that the reinforcing portion 21 is supported by the window trim T and the lower end region of the airbag 19X is supported by the reinforcing portion 21.

Figure 12:
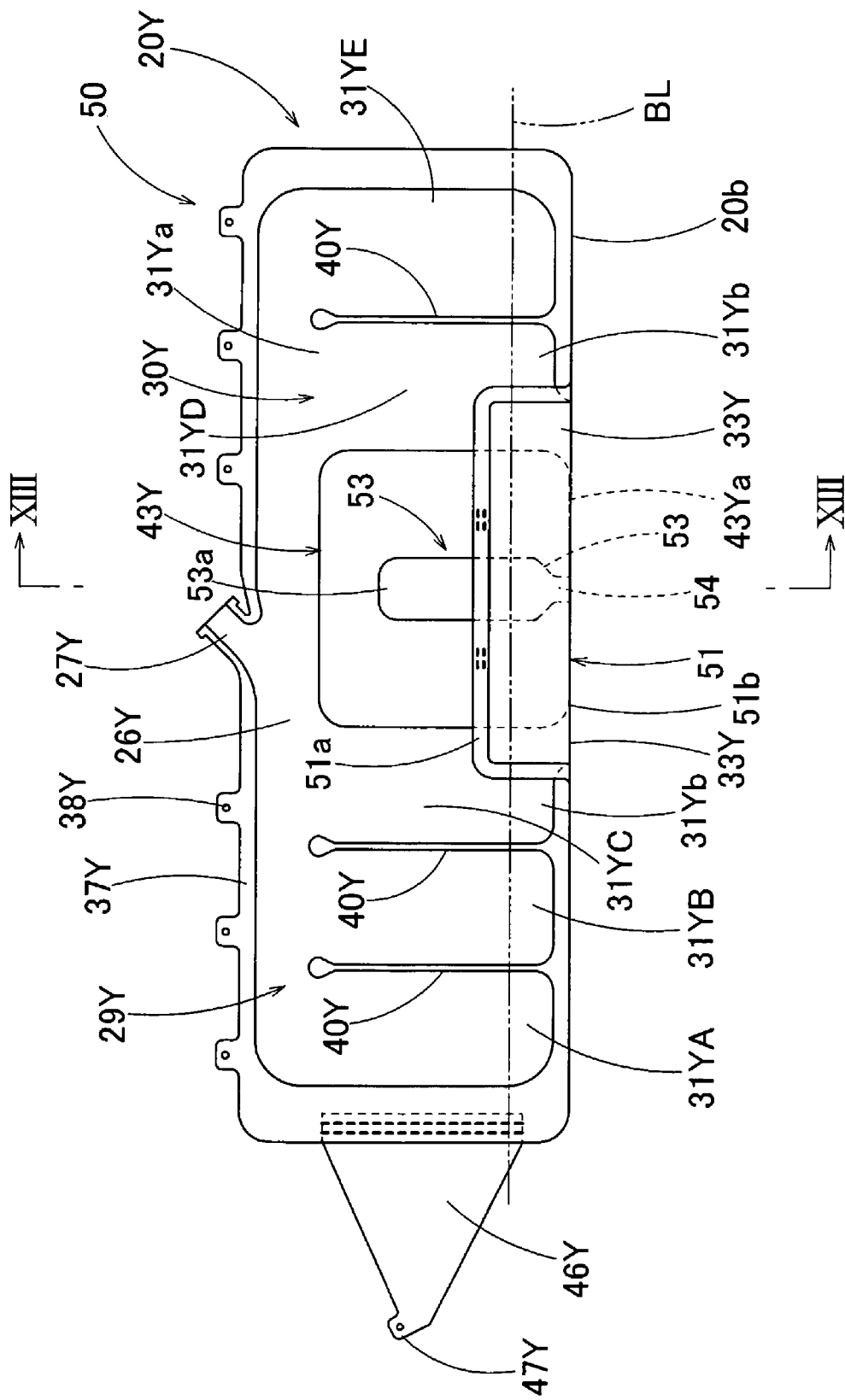
FIG. 12 is a front view of yet another embodiment of the airbag of the invention as flattened.
Figure 13:
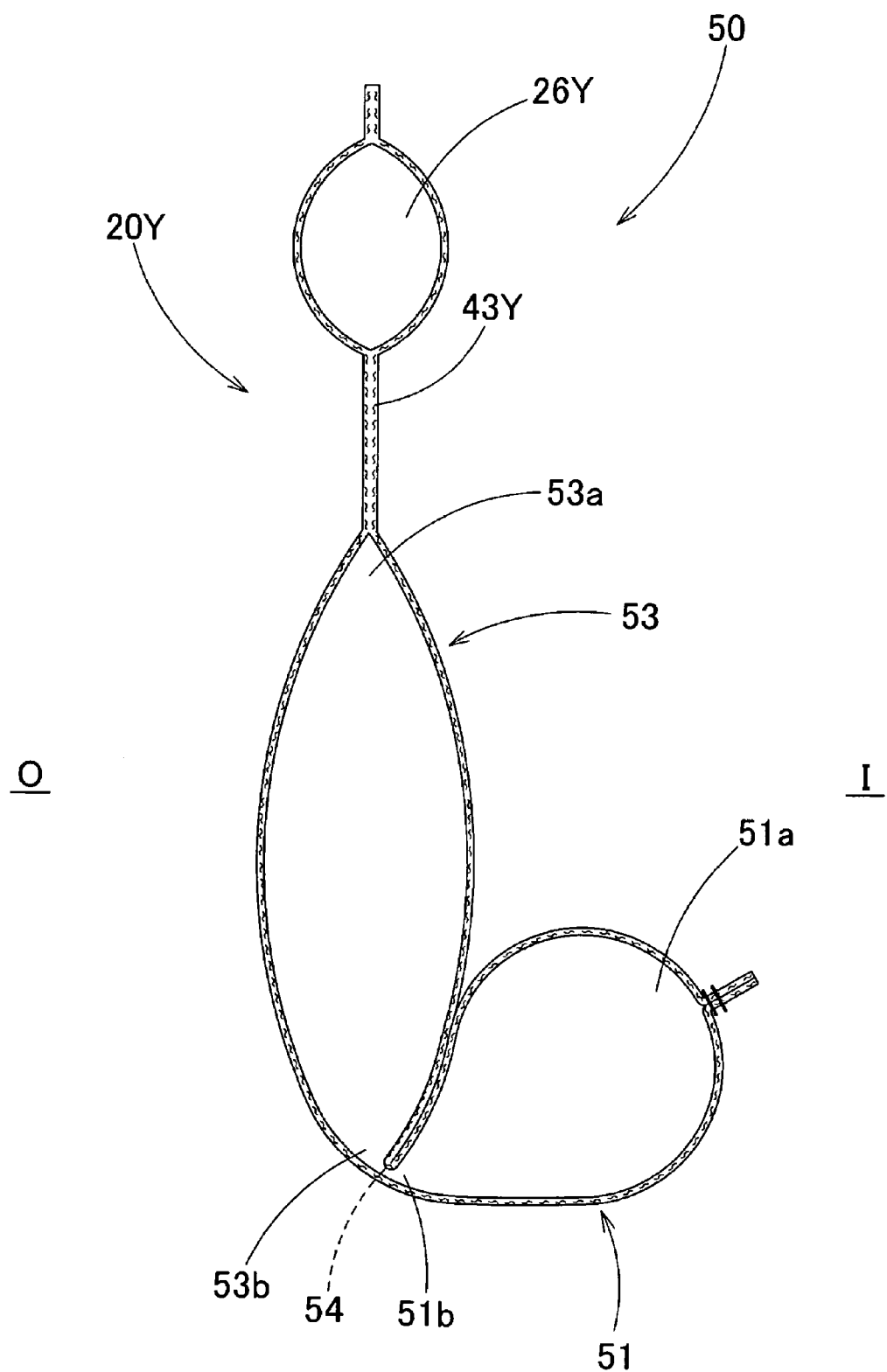
FIG. 13 is a vertical section of the airbag of FIG. 12 as inflated by itself, taken along line XIII-XIII of FIG. 12.

FIGS. 12 and 13 depict an airbag 50 according to another alternative embodiment of the invention. The airbag 50 has a similar structure to the afore-described airbag 19 except the location of the reinforcing portion 51 and a supplementary inflatable portion 53 formed on the panel portion 43Y of the main body 20Y, and therefore, descriptions of common elements will be omitted while adding a reference code "Y" to the reference numerals of the common elements. In the airbag 50, the reinforcing portion 51 is located in the vicinity of the center in a longitudinal or anteroposterior direction of the airbag 50. Specifically, the reinforcing portion 51 is gas communicated with the rearmost vertical cell 31YC of the first head-protecting portion 29Y and the front vertical cell 31YD of the second head-protecting portion 30Y and inflatable into a rod-like shape extending in a horizontal direction on the inboard side of the main body 20Y. In other words, the reinforcing portion 51 is located to extend across the vertical cells 31YC and 31YD adjoining each other via the panel portion 43Y proximate the lower ends 31Yb of the vertical cells 31YC and 31YD. Each of the vertical cells 31YC and 31YD includes at the lower end 31Yb a communication port 33Y for communication with the reinforcing portion 51.

Figure 14:
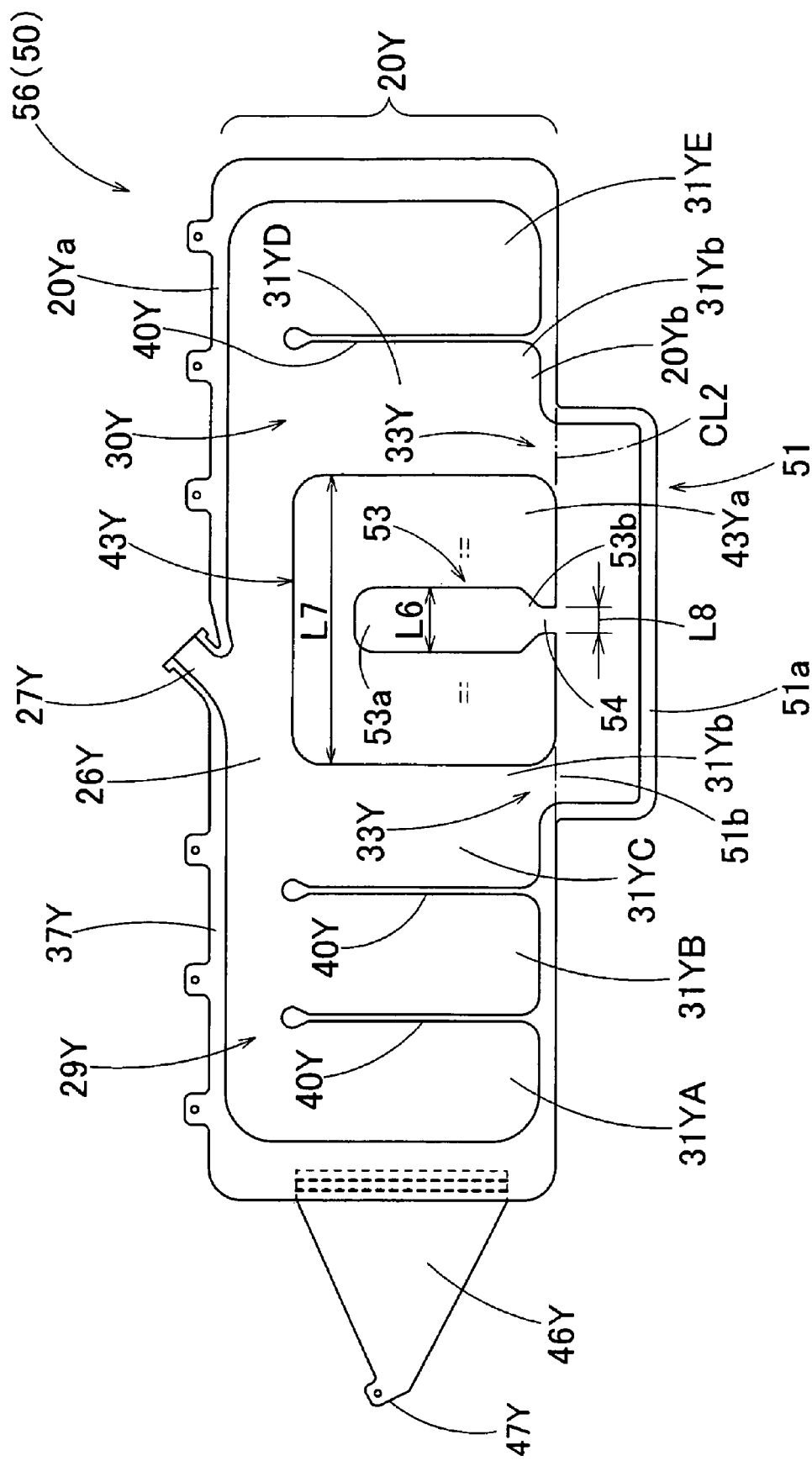
FIG. 14 is a front view of a material of the airbag of FIG. 12 as flattened.
Figure 15:
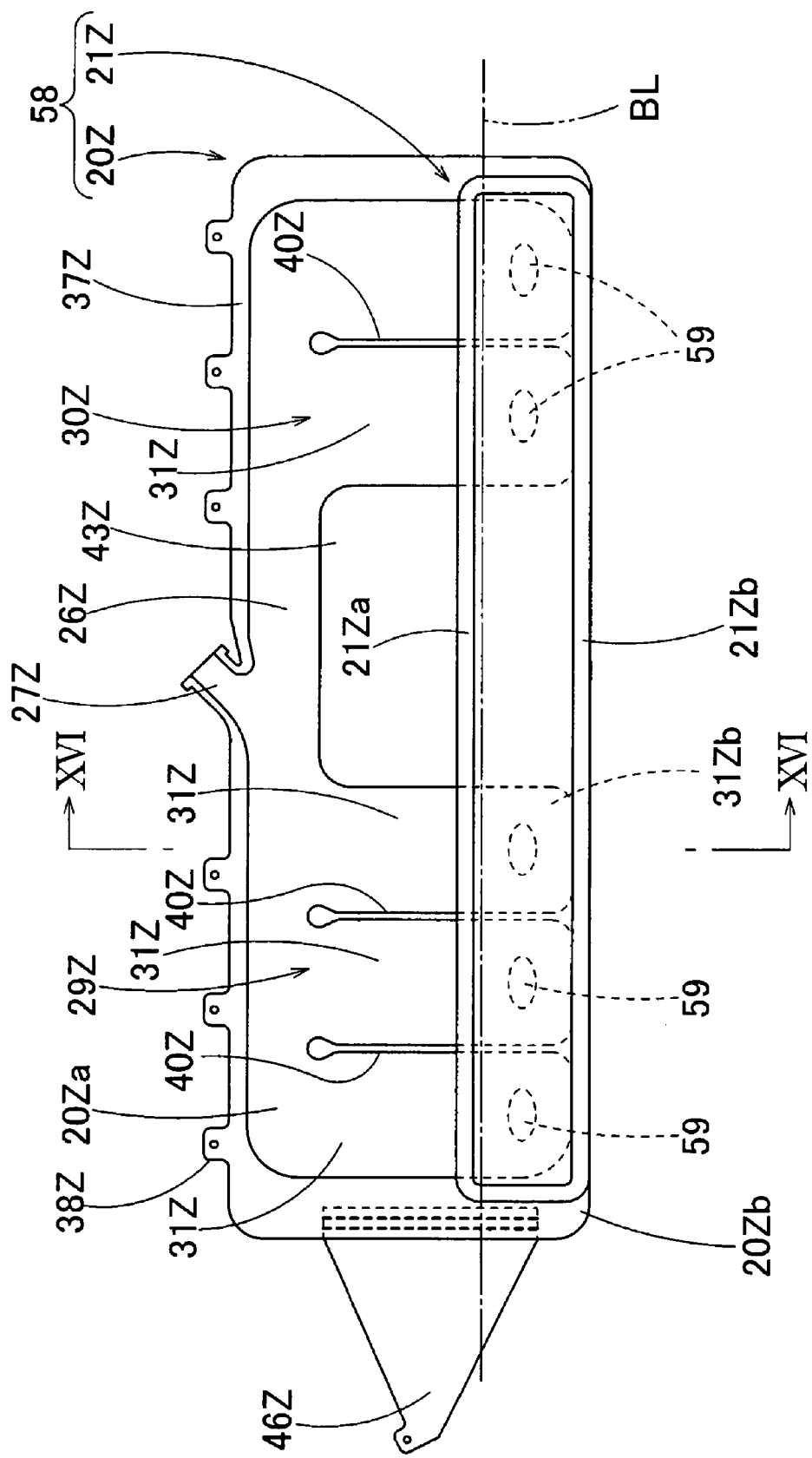
FIG. 15 is a front view of still another embodiment of the airbag of the invention as flattened.

The airbag 50 includes within an area of the panel portion 43Y a supplementary inflatable portion 53 which is inflatable with inflation gas. The supplementary inflatable portion 53 is closed at the top 53a whereas being open at the bottom 53b for gas communication with the reinforcing portion 51. In this embodiment, the supplementary inflatable portion 53 is formed at generally center in an anteroposterior direction of the panel portion 43Y. As shown in FIG. 14, the width L6 in an anteroposterior direction of the supplementary inflatable portion 53 is substantially ¼ of the width L7 in an anteroposterior direction of the panel portion 43Y. The width L8 in an anteroposterior direction of an inlet opening 54 formed at the bottom 53b of the supplementary inflatable portion 53, i.e. the opening width L8 of the opening 54, is smaller than the width L6 in an anteroposterior direction of the supplementary inflatable portion 53. The panel portion 43Y is so designed that the lower edge 43Ya generally conforms to the lower edge 20Yb of the main body 20Y.

As shown in FIG. 14, the airbag material 56 forming the airbag 50 is formed into a rectangle with a downward convex portion and has the main body 20Y and reinforcing portion 51 in one piece in such a manner that the lower end regions 20Yb and 51b at deployment are continuous. Each of the vertical partitioning portions 40Y of the airbag 50 extends upward from the lower edge portion of the peripheral portion 37Y in continuity with the peripheral portion 37Y. The airbag 50 is manufactured by folding back the convex portion of the material 56 or the reinforcing portion 51 toward the inboard side on the fold line CL2 extending along the lower edge 43Ya of the panel portion 43Y, as indicated by a double-dashed line in FIG. 14, and sewing the peripheral portion 37Y of the reinforcing portion 51 to the panel portion 43Y at the front and rear of the supplementary inflatable portion 53.

In such an airbag 50, too, the reinforcing portion 51 is deployable on the inboard side of the lower end region 20Yb of the main body 20 in a generally rod-like shape extending in a horizontal direction, in such a manner as to extend across the two vertical cells 31YC and 31YD adjoining each other via the panel portion 43Y proximate the lower ends 31Yb of the vertical cells 31YC and 31YD. With this configuration, even in the event that a pressure acting outward is applied on the panel portion 43Y, i.e. on the boundary of the vertical cells 31YC and 31YD, the reinforcing portion 51 serves like a supporting plate and prevents the main body 20Y of the airbag 50 from bending about the panel portion 43Y in a V-shape as viewed from above.

Moreover, the airbag 50 further includes in the area of the panel portion 43Y the supplementary inflatable portion 53 communicated with the reinforcing portion 51. Since the supplementary inflatable portion 53 inflates in such a manner as to be reduced in an anteroposterior width upon airbag deployment, a tensile force is generated on the airbag 50 (or main body 20Y) in an anteroposterior direction. Further, the fold line CL2 that turns up the reinforcing portion 51 is so formed as to close off the inlet opening 54 of the supplementary inflatable portion 53, such that the inner pressure of the inflatable portion 53, and thus the tensile force is maintained for an extended period of time. Especially, the reinforcing portion 51 of the airbag 50 is folded back on the fold line CL2 that extends along the lower edge 43Ya of the panel portion 43 passing through the inlet opening 54 of the supplementary inflatable portion 53. This configuration prevents inflation gas once having flown into the supplementary inflatable portion 53 from leaking therefrom via the inlet opening 54 in such a manner as to flow back into the reinforcing portion 51, such that the inner pressure of the supplementary inflatable portion 53 is maintained for a long period of time. Therefore, in the event that a vehicle makes a rollover after completion of airbag deployment, the main body 20Y keeps tense in an anteroposterior direction and prevents an occupant from ejection by the main body 20Y itself. The airbag 19 described above may be provided with such a supplementary inflatable portion.

In the airbag 19/19X described above, the reinforcing portion 21 is coupled to the main body 20 by the sewn seams TP located on the upper periphery 21a. However, the location of the sewn seams TP should not be limited thereby, but may be located on vertically intermediate positions of the reinforcing portion 21 as inflated on condition that the positions are above the beltline BL of a vehicle door. Nevertheless, when the reinforcing portion 21 is located on the inboard side I of the main body 20 as in the airbag 19, the reinforcing portion 21 is desirably coupled to the main body 20 by the upper periphery 21a or its vicinity from the viewpoint of securely catching an occupant's head H moving downward after contacting the main body 20. Moreover, in the foregoing embodiments, the reinforcing portion 21/51 is directly coupled to the main body 20/20Y by sewing, the fashion of coupling the reinforcing portion to the main body (or airbag) should not be limited thereby. A suitable adhesive may be used to couple the reinforcing portion to the main body. Furthermore, instead of coupling the reinforcing portion to the airbag directly, it will also be appreciated that, as indicated by double-dashed lines in FIG. 2, a plurality of bands SP may be provided vertically connecting the upper periphery of the reinforcing portion and the upper periphery of the main body (airbag) on the inboard side or outboard side of the airbag (main body), at some locations in an anteroposterior direction of the airbag.

Figure 16:
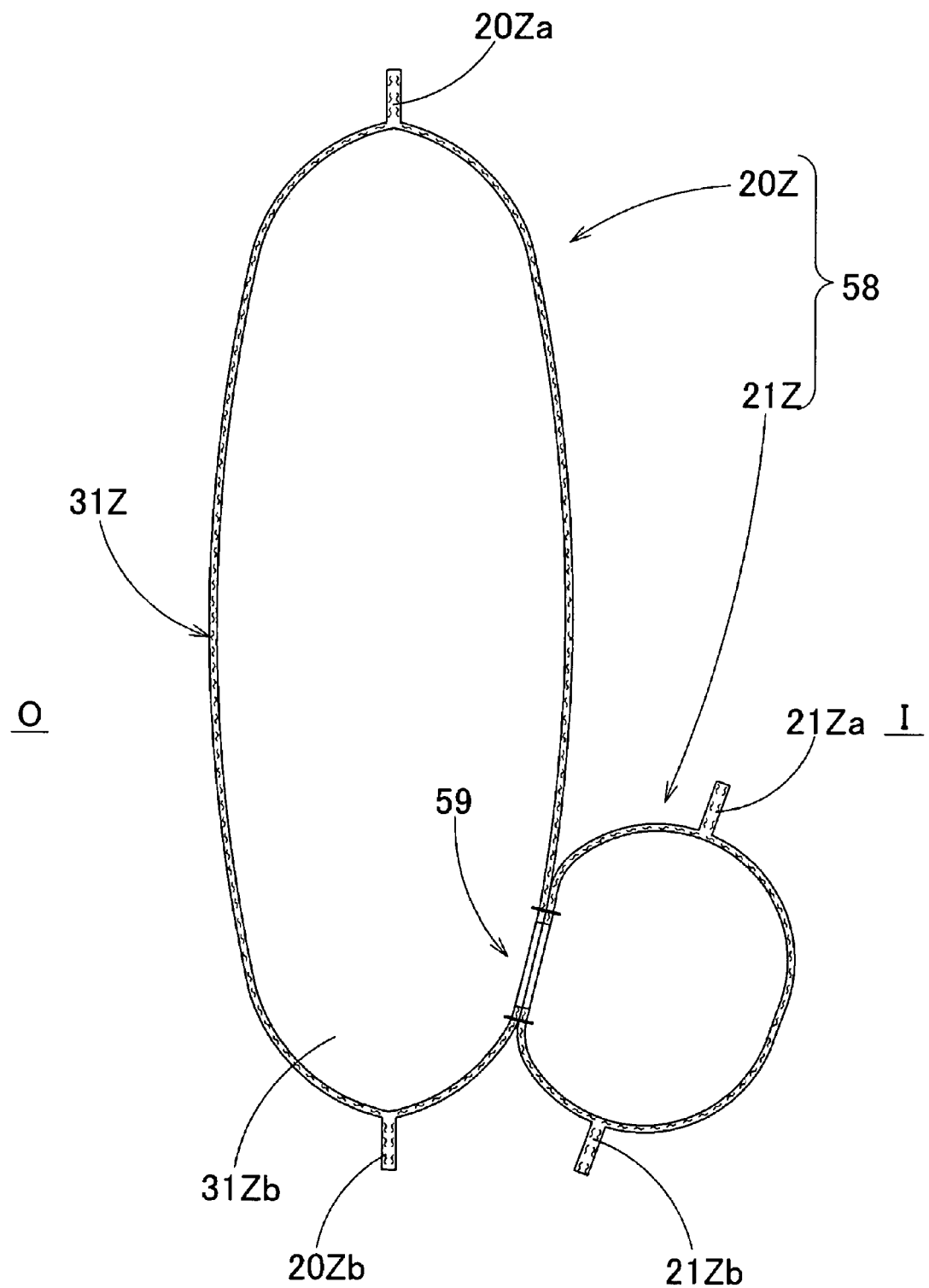
FIG. 16 is a vertical section of the airbag of FIG. 15 as inflated by itself, taken along line XVI-XVI of FIG. 15.
Figure 17:
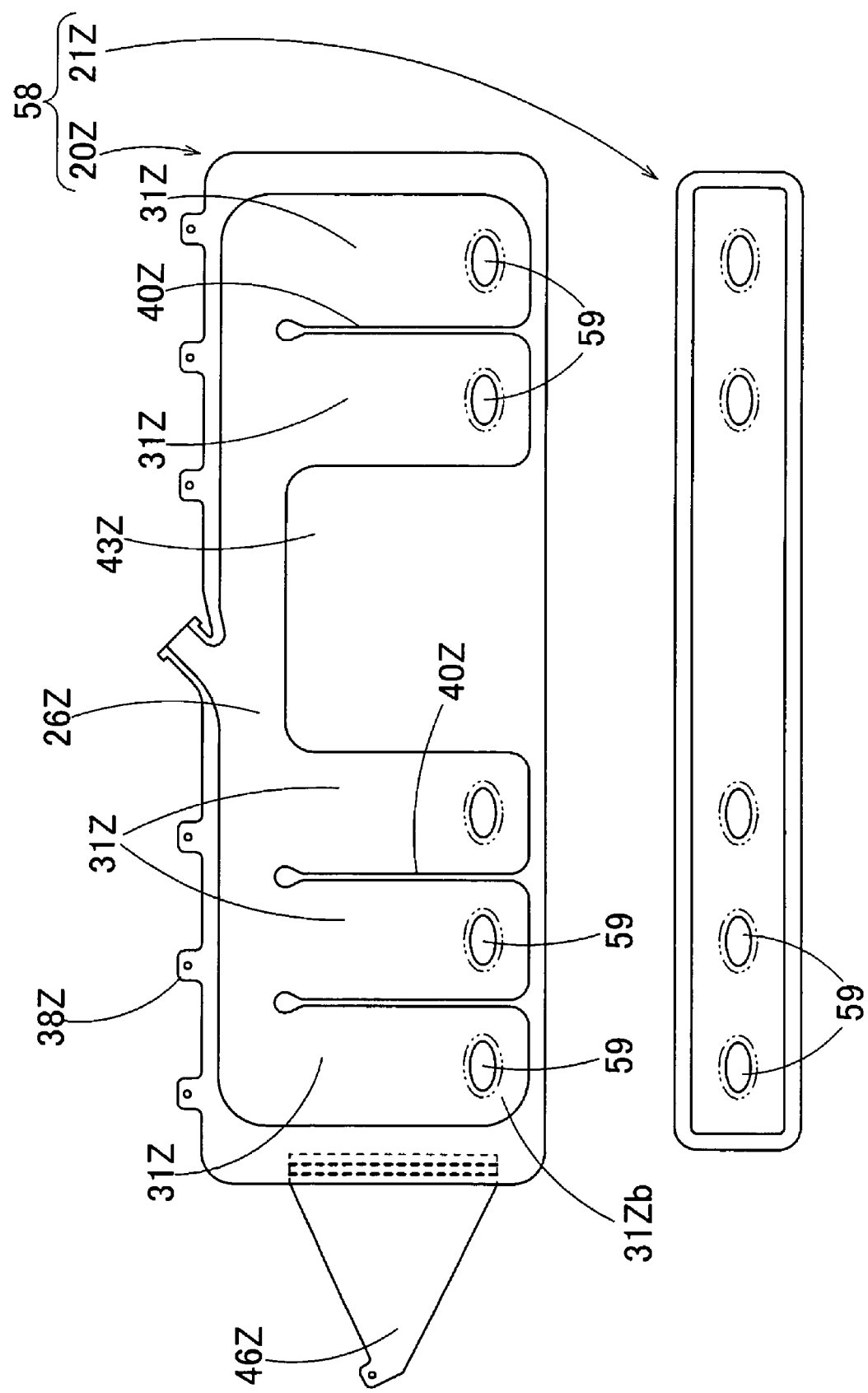
FIG. 17 depicts a main body and a reinforcing portion of the airbag of FIG. 15 as flattened.
Figure 18:
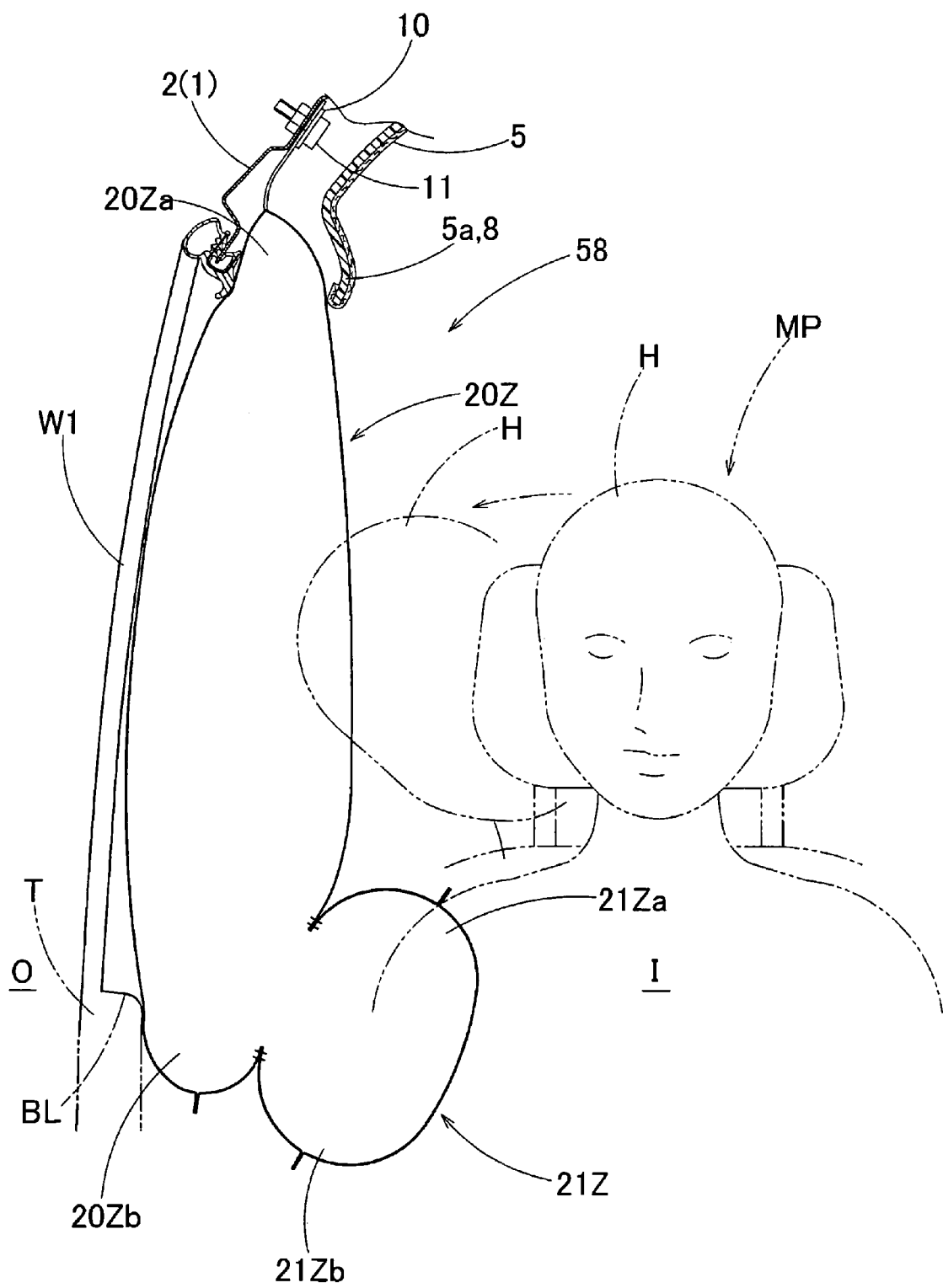
FIG. 18 is a schematic vertical section of the airbag of FIG. 15 as mounted on a vehicle and inflated.

Although the airbag 19/19X/50 of the foregoing embodiments has the main body 20/20Y and the reinforcing portion 21/51 in one piece, the main body and the reinforcing portion may be provided separately as in an airbag 58 depicted in FIGS. 15 to 18. The airbag 58 has a generally identical structure to the airbag 19 except that the reinforcing portion 21Z and the main body 20Z are provided separately in a shape of a bag. Therefore, detailed descriptions of common elements will be omitted while adding a reference code "Z" to the reference numerals of the common elements. The reinforcing portion 21Z is located on the inboard side I of the main body 20Z as well. In the airbag 58, the reinforcing portion 21Z and the main body 20Z are communicated with each other by communication ports 59 formed proximate the lower ends 31Zb of the vertical cells 31Z of the main body 20Z, and the reinforcing portion 21Z and the main body 20Z are coupled together by sewing peripheries of the communication ports 59 as shown in FIG. 16. That is, in the airbag 58, the reinforcing portion 21Z and the main body 20Z are coupled together at five locations lined up in an anteroposterior direction. This configuration conduces to deploy the reinforcing portion 21Z to cover the inboard side of the lower end region of the main body 20Z in a steady manner.

Although the reinforcing portion 21/21Z/51 of the foregoing embodiments has been described as deployable either on the inboard side or outboard side of the main body 20/20Y/20Z, the reinforcing portion may be designed deployable both on the inboard and outboard sides of the lower end region of the main body.

What is claimed is:
1. A head-protecting airbag apparatus adapted to be mounted on an upper periphery of a window of a vehicle, the airbag apparatus comprising:
an airbag secured to vehicle body structure by an upper edge thereof in a folded-up stored condition and on the upper periphery of the window for deployment on the inboard side of the window, the airbag having such a length in a vertical direction that the lower end region thereof is located on the beltline of a door of the vehicle upon deployment, the airbag comprising:
a plurality of vertical cells disposed side by side along an anteroposterior direction of the vehicle and each of which cells being inflatable into a rod-like shape extending generally vertically; and
a reinforcing portion located either on the inboard side or on the outboard side of at least two adjoining vertical cells out of the vertical cells at the lower end region of the airbag, the reinforcing portion being in gas communication with the adjoining vertical cells and inflatable into a horizontal rod-like shape extending across the adjoining vertical cells, wherein
- the airbag is formed by folding back an airbag material in which the reinforcing portion is arranged below the adjoining vertical cells on a fold line extending along the boundary of the vertical cells and the reinforcing portion and coupling overlapped portions partially; and
- each of the adjoining vertical cells includes at the lower end a communication port that allows gas communication with the reinforcing portion.

2. The head-protecting airbag apparatus according to claim 1, wherein:
- the airbag includes a gas admissive portion that is inflatable with inflation gas and a non-admissive portion that admits no inflation gas;
- the non-admissive portion includes a vertical partitioning portion that extends vertically and defines boundaries of the vertical cells and a horizontal partitioning portion that extends from lower ends of the vertical partitioning portions in a generally horizontal direction;
- each of the communication ports is provided between leading ends of the horizontal partitioning portions; and
- the airbag material is folded back on a fold line extending on the horizontal partitioning portions.

3. The head-protecting airbag apparatus according to claim 2, wherein each of the horizontal partitioning portions extends with an inclination relative to the horizontal direction such that the leading end thereof is directed upward.

4. The head-protecting airbag apparatus according to claim 1, wherein:
- the airbag further includes at an intermediate position in an anteroposterior direction and between a pair of the vertical cells a panel portion that admits no inflation gas and is greater than the adjoining vertical cells in a width in an anteroposterior direction;
- the reinforcing portion is located on lower end regions of the panel portion and the vertical cells located on the front and rear of the panel portion; and
- the panel portion includes within an area thereof a supplementary inflatable portion that is in communication with the reinforcing portion.

5. The head-protecting airbag apparatus according to claim 1 wherein the reinforcing portion extends over an entire length in an anteroposterior direction of an inflatable area of the airbag.

6. The head-protecting airbag apparatus according to claim 1 wherein the reinforcing portion is located on the inboard side of the adjoining vertical cells.

7. The head-protecting airbag apparatus according to claim 1 wherein the reinforcing portion is located on the outboard side of the adjoining vertical cells.

* * * * *